United States Patent
Hamilton et al.

(10) Patent No.: US 9,035,162 B2
(45) Date of Patent: May 19, 2015

(54) SYNTHETIC MULTI-STRING MUSICAL INSTRUMENT WITH SCORE CODED PERFORMANCE EFFECT CUES AND/OR CHORD SOUNDING GESTURE CAPTURE

(71) Applicant: Smule, Inc., Palo Alto, CA (US)

(72) Inventors: Robert Hamilton, Palo Alto, CA (US); Nick Kruge, San Francisco, CA (US); Ge Wang, Palo Alto, CA (US)

(73) Assignee: Smule, Inc., San Francisco, CA (US)

( * ) Notice: Subject to any disclaimer, the term of this patent is extended or adjusted under 35 U.S.C. 154(b) by 83 days.

(21) Appl. No.: 13/715,920

(22) Filed: Dec. 14, 2012

(65) Prior Publication Data

US 2013/0180385 A1    Jul. 18, 2013

Related U.S. Application Data

(60) Provisional application No. 61/570,701, filed on Dec. 14, 2011.

(51) Int. Cl.
*G10H 1/38* (2006.01)
*G10H 7/00* (2006.01)
(Continued)

(52) U.S. Cl.
CPC ........... *G10H 1/0033* (2013.01); *G10H 1/0016* (2013.01); *G10H 1/368* (2013.01);
(Continued)

(58) Field of Classification Search
CPC .............. G10H 1/38; G10H 2230/015; G10H 2230/021; G06F 3/011; G06F 3/017
USPC ................................................... 84/613, 637
See application file for complete search history.

(56) References Cited

U.S. PATENT DOCUMENTS

| 5,587,548 | A | 12/1996 | Smith, III |
| 6,188,008 | B1 * | 2/2001 | Fukata .................. 84/470 R |
| 7,273,979 | B2 * | 9/2007 | Christensen .............. 84/615 |
| 7,563,974 | B2 | 7/2009 | Ozaki et al. |

(Continued)

FOREIGN PATENT DOCUMENTS

| KR | 20070019090 A | 2/2007 |
| KR | 20090091266 A | 8/2009 |

OTHER PUBLICATIONS

Gaye, L. et al., "Mobile music technology: Report on an emerging community", Proceedings of the International Conference on New Interfaces for Musical Expression, pp. 22-25, Paris, France, 2006.

(Continued)

*Primary Examiner* — Jeffrey Donels
(74) *Attorney, Agent, or Firm* — Haynes and Boone, LLP

(57) ABSTRACT

A synthetic multi-string musical instrument captures a stream of expressive gestures indicated on a multi-touch sensitive display for note/chord soundings and associated performance effects and embellishments. Visual cues in accord with a musical score may be revealed/advanced at a current performance tempo, but it is the user's gestures that actually drive the audible performance rendering via digital synthesis. Opportunities for user expression (or variance from score) include onset and duration of note soundings, tempo changes, as well as uncued string bend effects, vibrato, etc. Gesturing mechanism are provide to allow user musicians to sound chords without having to register precisely accurate multi-touch screen contacts. This can be especially helpful for mobile phone, media player and game controller embodiments, where there is generally limited real-estate to display six (6) or more strings, and user fingers are generally too fat to precisely contact such strings.

69 Claims, 9 Drawing Sheets

(51) Int. Cl.
*G10H 1/00* (2006.01)
*G10H 1/36* (2006.01)
*G09B 15/00* (2006.01)

(52) U.S. Cl.
CPC .... *G10H2220/051* (2013.01); *G10H 2220/096* (2013.01); *G10H 2220/241* (2013.01); *G09B 15/002* (2013.01)

(56) References Cited

U.S. PATENT DOCUMENTS

| | | | |
|---|---|---|---|
| 7,906,720 B2 | 3/2011 | Delorme | |
| 7,985,917 B2 * | 7/2011 | Morris et al. | 84/637 |
| 8,378,194 B2 | 2/2013 | Daisy | |
| 8,426,716 B2 * | 4/2013 | Little et al. | 84/613 |
| 8,539,368 B2 * | 9/2013 | Nam et al. | 715/769 |
| 8,751,971 B2 * | 6/2014 | Fleizach | 715/863 |
| 2007/0180978 A1 | 8/2007 | Ozaki et al. | |
| 2007/0221046 A1 | 9/2007 | Ozaki et al. | |
| 2008/0254824 A1 | 10/2008 | Moraes | |
| 2008/0280680 A1 | 11/2008 | Dutilly et al. | |
| 2009/0312102 A1 | 12/2009 | Oberg et al. | |
| 2010/0282044 A1 | 11/2010 | Delorme | |
| 2010/0287471 A1 * | 11/2010 | Nam et al. | 715/702 |
| 2011/0088535 A1 | 4/2011 | Zarimis | |
| 2011/0107899 A1 | 5/2011 | Charles | |
| 2011/0130204 A1 | 6/2011 | Delorme | |
| 2011/0146477 A1 * | 6/2011 | Tsukamoto | 84/485 R |
| 2011/0185880 A1 | 8/2011 | Charles | |
| 2011/0234503 A1 * | 9/2011 | Fitzmaurice et al. | 345/173 |
| 2011/0283868 A1 | 11/2011 | Behringer et al. | |
| 2011/0316793 A1 | 12/2011 | Fushiki | |
| 2012/0160079 A1 * | 6/2012 | Little et al. | 84/613 |
| 2012/0174735 A1 | 7/2012 | Little et al. | |
| 2012/0174736 A1 * | 7/2012 | Wang et al. | 84/622 |
| 2013/0283159 A1 * | 10/2013 | Nam et al. | 715/702 |

OTHER PUBLICATIONS

Wang, Ge. "Designing Smule's iPhone Ocarina." Center for Computer Research in Music and Acoustics, Stanford University. Jun. 2009. Print. 5 pages.

Geiger, G. "Using the Touch Screen as a Controller for Portable Computer Music Instruments" Proceedings of the 2006 International Conference on New Interfaces for Musical Expression (NIME06), Paris France, pp. 61-64.

Geiger, G. "PDa: Real Time Signal Processing and Sound Generation on Handheld Devices" In Proceedings of the International Computer Music Conference, Barcelona, 2003, pp. 1-4.

Schiemer, G. and Havryliv, M. "Pocket gamelan: tuneable trajectories for flying sources in Mandala 3 and Mandala 4", In Proceedings of the 2006 Conference on New Interfaces for Musical Expression, Jun. 2006, Paris France, pp. 37-42.

Tanaka, A. "Mobile Music Making" In Proceedings of the 2004 Conference on New Interfaces for Musical Expression, Jun. 2004, pp. 154-156.

G. Wang et al., "MoPhO: Do Mobile Phones Dream of Electric Orchestras?" In Proceedings of the International Computer Music Conference, Belfast, Aug. 2008.

G. Essl et al., "Mobile STK for Symbian OS." In Proceedings of the International Computer Music Conference, New Orleans, Nov. 2006.

G. Essl et al., "ShaMus—A Sensor-Based Integrated Mobile Phone Instrument." In Proceedings of the International Computer Music Conference, Copenhagen, Aug. 2007.

Robert Bristow-Johnson. "Wavetable Synthesis 101, A Fundamental Perspective." Web. <http://musicdsp.org/files/Wavetable-101.pdf>. Last accessed Mar. 15, 2012. pp. 1-27.

Pakarinen et al. "Review of Sound Synthesis and Effects Processing for Interactive Mobile Applications." Report No. 8, Department of Signal Processing and Acoustics (TKK) Report Series. Mach 23, 2009. [Retrieved: Feb. 24, 2012]. Web. <http://www.acoustics.hut.fi/publications/papers/mobilesynthandfxreport/mobilesynthandfxreport.pdf> entire document.

Pocket Guitar. Pocket Guitar Review by AppGuide. May 29, 2009. [Retrieved on Feb. 24, 2012]. <http://www.macworld.com/appguide/app.html?id-69168&expand=false>. entire document.

* cited by examiner

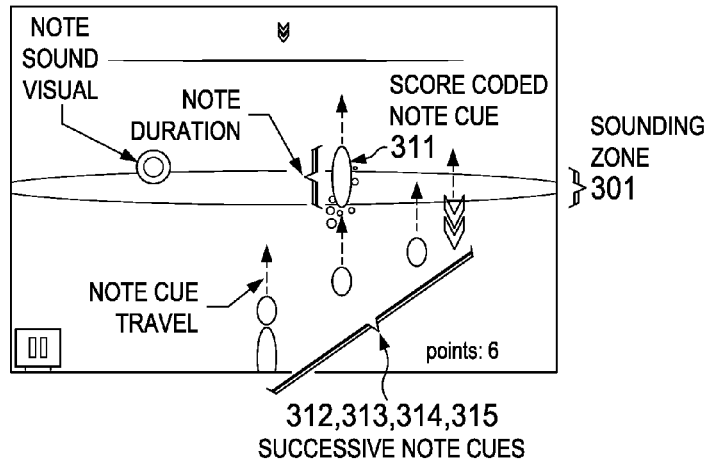
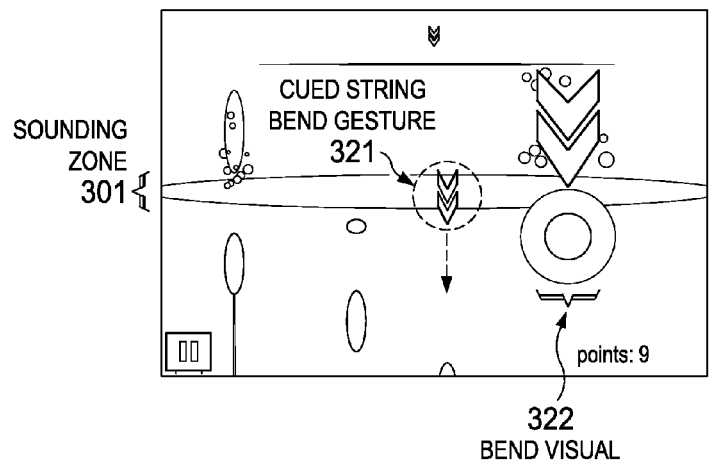
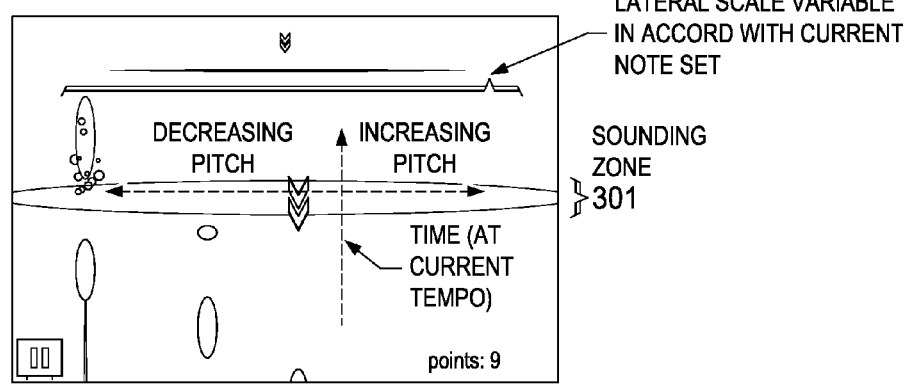

FIG. 7A
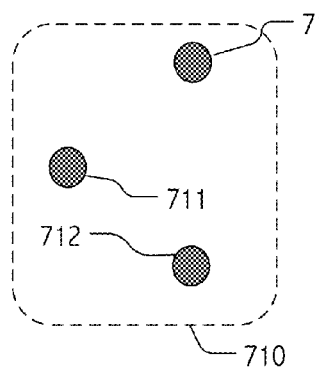
FIG. 7B
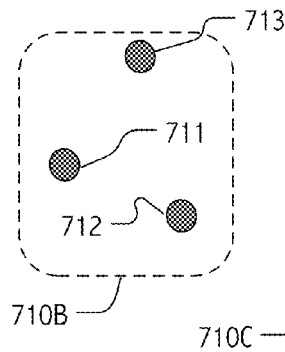
FIG. 7C
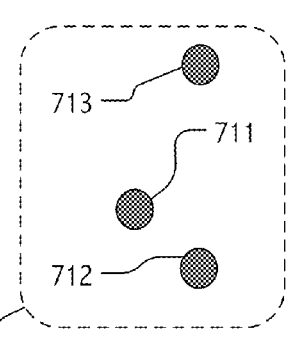
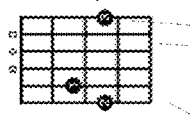
G major
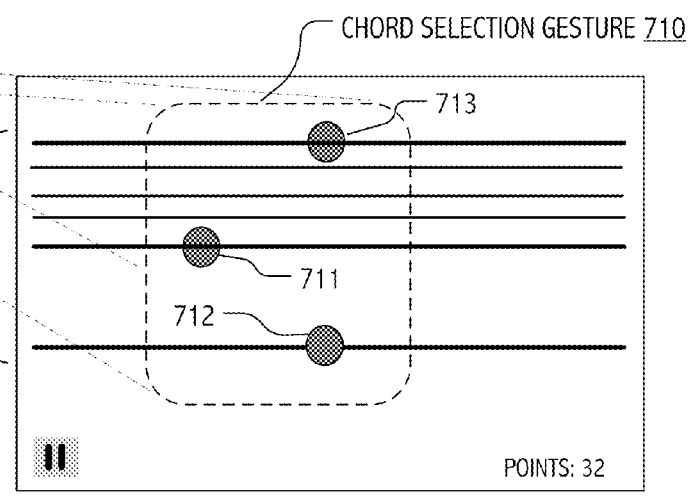
CHORD SELECTION GESTURE 710
STRINGS 740 REVEALED IN RESPONSE TO GESTURED CHORD SELECTION
POINTS: 32
FIG. 7D
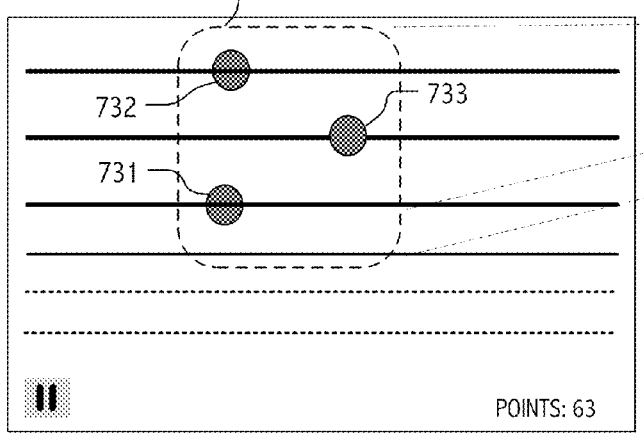
CHORD SELECTION GESTURE 730
POINTS: 63
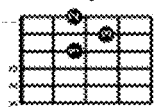
D major
FIG. 7E

SYNTHETIC MULTI-STRING MUSICAL INSTRUMENT WITH SCORE CODED PERFORMANCE EFFECT CUES AND/OR CHORD SOUNDING GESTURE CAPTURE

CROSS-REFERENCE TO RELATED APPLICATION(S)

The present application claims the benefit of U.S. Provisional Application No. 61/570,701, filed Dec. 14, 2011, the entirety of which is incorporated herein by reference.

BACKGROUND

1. Field of the Invention

The invention relates generally to musical instruments and, in particular, to techniques suitable for use in portable device hosted implementations of musical instruments for capture and rendering of musical performances with game-play features.

2. Related Art

The installed base of mobile phones and other handheld compute devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other digital signal processing. Indeed, modern mobile phones and handheld compute devices, including iOS™ devices such as the iPhone™, iPod Touch™ and iPad™ digital devices available from Apple Inc. as well as competitive devices that run the Android operating system, tend to support audio (and indeed video) playback and processing quite capably. In addition, multi-touch user interface frameworks provided in such devices create new opportunities for human machine interactions.

These capabilities (including processor, memory and I/O facilities suitable for real-time digital signal processing, hardware and software CODECs, audiovisual and touch screen APIs, etc.) have contributed to vibrant application and developer ecosystems. Examples from the synthetic musical instrument application space include the popular Ocarina, Magic Piano and Magic Guitar social music apps and the innovative Magic Fiddle app, all from Smule, Inc. As synthetic musical instruments designs develop and mature, innovative techniques are needed to simulate, extend and, indeed, improve upon musician-instrument interactions that, while familiar from the physical world, present challenges for implementations of synthetic instruments on general purpose hardware such as the ubiquitous mobile phones and handheld compute devices discussed above. Likewise, innovative digital synthetic instrument designs are needed to tap the potential of engaging social, interactive, and even game-play experiences.

SUMMARY

Despite practical limitations imposed by mobile device platforms and applications, truly captivating musical instruments may be synthesized in ways that allow musically expressive performances to be captured and rendered in real-time. In some cases, synthetic musical instruments can provide a game, grading or instructional mode in which one or more qualities of a user's performance are assessed relative to a musical score. In some cases, embodiments or modes, visual cues presented on a multi-touch sensitive display provide the user with temporally sequenced note and/or chord selections throughout a performance in accordance with the musical score. Note or chord soundings (or selections) are indicated by user gestures captured at the multi-touch sensitive display, and one or more measures of correspondence between actual note soundings and the temporally sequenced note and chord selections may be used to grade the user's performance. In some cases, embodiments or modes, note soundings may be coordinated but gestured (and indeed graded) separately from note/chord selections.

In general, particular visual cuing and note sounding gesture sets may be particular to the synthetic musical instrument implemented. For example, in a piano-type synthetic instruments configurations reminiscent of that popularized by Smule, Inc. in its Magic Piano application for iPad devices, user digit contacts (e.g., finger and/or thumb contacts) at laterally displaced positions on the multi-touch sensitive display constitute gestures indicative of key strikes, and a digital acoustic model of a piano is used to render an audible performance in correspondence with captured user gestures. In contrast, synthetic multi-string instruments such as that popularized by Smule, Inc. in its Magic Fiddle application for iPad devices typically present a visual depiction of a multiplicity of strings with which a user may interact to sound notes and/or chords.

It has been discovered that, notwithstanding the multi-string nature of certain instruments that may be synthesized (e.g., guitars), alternative visual cuing and gesture expression models may be more suitable for the limited touch-screen real-estate provided by mobile handheld devices such as phones, media players, gaming controllers, etc. Accordingly, a "piano roll" style set of visual cues has been adopted to provide a song-mode user of a synthetic guitar-type (multi-string) musical instrument with note and/or chord selection cues (in accordance with a musical score). Thus, the visual cuing and note expression gesture model for a multi-string fretted instrument can rationalized and simplified to a laterally extended note sounding zone, without regard to fretted quantization of pitches or allocations to respective strings.

The synthetic guitar-type (multi-string) musical instrument captures a stream of expressive gestures indicated on a multi-touch sensitive display for note/chord soundings and associated performance effects and embellishments. While the visual cues are driven by a musical score and revealed/advanced at a current performance tempo, it is the user's gestures that actually drive the audible performance rendering. Opportunities for user expression (or variance from score) include onset and duration of note soundings, tempo changes, as well as uncued string bend effects, vibrato, etc.

It has further been discovered that, by using a fretless, laterally extended note sounding zone, lateral extent can be dynamically allocated so that the pitch range of available notes (and spacing between note selective positions) can be allocated to laterally distribute a current contextually relevant set of note sounding positions along the available lateral extent of a multi-touch sensitive display. In general, range and/or spacing may be dynamically selected based a note set employed in a current song selection or portion thereof. In this way, visual cues and user note sounding gestures may be distributed across the multi-touch sensitive display in a manner that makes it easier for the user musician to play. The synthetic guitar may allocate finger space to each note, but need only allocate space for the note set that is necessary to play the current selection or song (or to play at a current point within a current selection or song).

It has further been discovered that, particularly in freestyle modes of play, it is possible to provide users with a gesturing mechanism to sound chords without having to register precisely accurate multi-touch screen contacts. This is especially important for mobile phone, media player and game controller embodiments, where there is generally limited real-estate to display six (6) or more strings, and user fingers are generally too fat to precisely contact such strings. Instead, for a given key and context, most of the important chords have a distinguishing "shape" and location in terms of the fingers that contact the strings and strings that are contacted.

By recognizing in multi-touch gesture capture, that an E major chord is gestured as an obtuse triangle of finger contacts at the top of the strings (screen), an A minor chord has the same shape but is lower on the screen, an A major chord is gestured as a linear arrangement of finger contacts near the bottom of the screen, a C major chord is gestured as an upward diagonal arrangement of finger contacts at the center of the screen, and a D major chord is gestured as a nearly equilateral triangle of finger contacts at the bottom of the screen, etc., it is possible to reliably guess at the most likely chord sounding expressed by the user. The user doesn't have to hit strings and frets exactly. Indeed, positional registration along respective string display artifacts need not matter at all, or can a little but not as critically as real frets. Rather, the user may simply gesture finger contacts in roughly the right shape at roughly the right portion of the screen. Gesture recognition and capture algorithm(s) identify the sounded chord and supply appropriate gesture-driven inputs to a multi-string synthesis. In some embodiments, strings are displayed or dynamically revealed beneath the finger contacts in correspondence with the recognized chord to visually reinforce the chord indication.

In general, audible rendering includes synthesis of tones, overtones, harmonics, perturbations and amplitudes and other performance characteristics based on the captured gesture stream. In some cases, rendering of the performance includes audible rendering by converting to acoustic energy a signal synthesized from the gesture stream encoding (e.g., by driving a speaker). In some cases, the audible rendering is on the very device on which the musical performance is captured. In some cases, the gesture stream encoding is conveyed to a remote device whereupon audible rendering converts a synthesized signal to acoustic energy.

Thus, in some embodiments, a synthetic musical instrument (such as a synthetic guitar) allows the human user to control an actual expressive physical model of a vibrating string using multi-sensor interactions (e.g., fingers on strings or at frets, strumming, bending, damping, etc.) via a multi-touch sensitive display. In this way, the user is actually causing the sound and controlling the parameters affecting pitch, quality, etc. A variety of computational techniques may be employed and will be appreciated by persons of ordinary skill in the art. For example, exemplary techniques include (i) wavetable or FM synthesis and, in some cases, embodiments or modes (ii) physical modeling of string vibration and acoustics of the modeled instrument.

In some embodiments, a storybook mode provides lesson plans which teach the user to play the synthetic instrument and exercise. User performances may be graded (or scored) as part of a game (or social-competitive application framework), and/or as a proficiency measure for advancement from one stage of a lesson plan to the next. In general, better performance lets the player (or pupil) advance faster. High scores both encourage the pupil (user) and allow the system to know how quickly to advance the user to the next level and, in some cases, along which game or instructive pathway. In each case, the user is playing a real/virtual physical model of an instrument, and their gestures actually control the sound, timing, etc.

Often, both the device on which a performance is captured and that on which the corresponding gesture stream encoding is rendered are portable, even handheld devices, such as pads, mobile phones, personal digital assistants, smart phones, media players, or book readers. In some cases, rendering is to a conventional audio encoding such as AAC, MP3, etc. In some cases, rendering to an audio encoding format is performed on a computational system with substantial processing and storage facilities, such as a server on which appropriate CODECs may operate and from which content may thereafter be served. Often, the same gesture stream encoding of a performance may (i) support local audible rendering on the capture device, (ii) be transmitted for audible rendering on one or more remote devices that execute a digital synthesis of the musical instrument and/or (iii) be rendered to an audio encoding format to support conventional streaming or download.

Chord Sounding Gesture Capture

In some embodiments in accordance with the present invention(s), a method of providing a synthetic instance of a multi-string musical instrument using a portable computing device includes (i) capturing chord sounding gestures indicated by a user on a multi-touch sensitive display of the portable computing device, (ii) distinguishing between respective multiple-finger contact geometries gestured by the user and, based thereon, passing a stream of chord indicative inputs to a digital synthesis of the multi-string musical instrument executing on the portable computing device, and (iii) in correspondence with the stream of captured chord indicative gestures, audibly rendering a performance on the portable computing device using the digital synthesis. The captured chord sounding gestures include, for particular and respective chords so gestured, contact by multiple fingers of the user's hand and wherein the captured chord sounding gestures are characterized by respective geometries of the multiple-finger contacts rather than solely by positional registrations of individual finger contacts relative to string or fret positions.

In some embodiments, the chord sounding gesture capturing includes retrieving, in response to a multi-touch application programmer interface (API) notification, a touch count and coordinates for respective ones of the touches. In some cases, the distinguishing includes, for two-touch contact gestures indicative of a two-note chord characterizing orientation of line traceable through the touch coordinates and based thereon distinguishing between at least some supported ones of the two-touch contact gestures. In some cases, the distinguishing further includes characterizing first-dimension coordinates of a captured two-touch contact gesture to distinguish between major and minor chord. In some cases, the distinguishing includes, for three-touch contact gestures indicative of a three-note chord, characterizing both shape defined by the touch coordinates and an orientation thereof and, based on the shape and orientation characterization, distinguishing between at least some supported ones of the three-touch contact gestures.

In some cases, the distinguishing further includes (i) for a three-touch contact gesture characterized as an upward-pointed, triangular arrangement, indicating a G major chord; (ii) for a three-touch contact gesture characterized as an downward-pointed, triangular arrangement, indicating a D major chord; (iii) for a three-touch contact gesture characterized as a generally-linear arrangement, sloping upwards left-to-right, indicating a C major chord, and (iv) for a three-touch contact gesture characterized as a generally-linear arrangement, sloping downwards left-to-right, indicating an F major chord.

In some cases, the distinguishing further includes for four-touch contact gestures indicative of a four-note chord (i) characterizing both shape defined by coordinates of an initial three of the four touches and by an orientation thereof; (ii) further characterizing a positional relation between the characterized shape and a fourth of the four touches; (iii) based on the shape and orientation characterization of the initial three (3) touch coordinates, initially distinguishing between at least some supported major chords; and (iv) based on the characterized positional relation, distinguishing between major and dominant $7^{th}$ variants of the initially distinguished major chords.

In some cases, the distinguishing includes characterizing second-dimension coordinates of a captured multi-touch contact gesture to distinguish between a root chord and one or more successive inversions thereof. In some cases, the chord sounding gesture capturing includes capture of both: a multi-touch chord selection gesture; and a traveling-touch, strum-type gesture.

In some embodiments, the method includes providing a synthetic strum in accord with score-coded meter, the synthetic strum releasing a constituent note or chord indications to the digital synthesis based on a then-current one of the captured note sounding gestures.

In some cases, the distinguishing is contextually constrained based at least in part on a then-current musical key. In some cases, the current musical key is either user-selected or score-coded.

In some embodiments, the method includes, responsive to the captured chord sounding gestures, visually displaying strings of the multi-string musical instrument on the multi-touch sensitive display in correspondence with the user's performance and at positions beneath one or more of the respective finger contacts. In some cases, selection and positioning of the visually displayed strings are dynamically varied in correspondence with the captured chord sounding gestures. In some cases, fret positions and lateral extent of the visually displayed strings are dynamically varied in correspondence with the captured chord sounding gestures.

In some embodiments, the method further includes presenting the user of the synthetic musical instrument with visual cues on the multi-touch sensitive display, the presented visual cues indicative of temporally sequenced chord selections to be sounded by the user in accord with a musical score. In some cases, the chord-indicative visual cues are presented using a symbology evocative of shape and orientation of finger contacts that define a particular chord sounding gesture cued. In some cases, the presented visual cues include at least some visual cues indicative of individual note selections. In some cases, notwithstanding multi-string nature of the synthetic musical instrument, the presentation of the visual cues is piano roll style, wherein individual visual cues travel toward pitch indicative positions along a laterally extended sounding zone of the multi-touch sensitive display. In some cases, lateral extent of the sounding zone is dynamically allocated so that pitch range of available notes and spacing between note selective positions distributes a current contextually relevant set of sounding positions along the available lateral extent of a multi-touch sensitive display.

In some embodiments, the method further includes determining correspondence of respective captured chord sounding gestures with the visually cued chord selections; and grading the user's performance at least in part based on the determined correspondences, wherein the determined correspondences include (i) a measure of temporal correspondence of a particular chord sounding gesture with arrival of a visual cue in the sounding zone and (ii) a measure correspondence of the chord sounded with the visual cue.

In some cases, the stream of chord indicative inputs includes constituent pluralities of note selection inputs consistent with a temporal sequence of the captured and distinguished chord sounding gestures. In some cases, the digital synthesis includes a sample-based synthesis of constituent notes of the captured chord. In some cases, the digital synthesis includes a sample-based synthesis of the captured chord. In some cases, the audible rendering includes modeling acoustic response for the multi-string instrument; and driving the modeled acoustic response with inputs corresponding to the captured chord sounding gestures.

In some embodiments, the synthetic multi-string instrument is a guitar, and the visual cues travel across the multi-touch sensitive display and represent, in one dimension of the multi-touch sensitive display, desired finger contacts along a fretless single-string analog of the multi-string instrument in accordance with notes of the score and, in a second dimension generally orthogonal to the first, temporal sequencing of the desired finger contacts paced in accord with a current tempo.

In some embodiments, the method further includes presenting on the multi-touch sensitive display a lesson plan of exercises, wherein the captured chord selection gestures correspond to performance by the user of a particular one of the exercises; and advancing the user to a next exercise of the lesson plan based on a grading of the user's performance of the particular exercise.

In some embodiments, the portable computing device includes a communications interface, and the method further includes transmitting an encoded stream of the note selection gestures via the communications interface for rendering of the performance on a remote device.

In some embodiments, the method further includes geocoding the transmitted gesture stream; and displaying a geographic origin for, and in correspondence with audible rendering of, another user's performance encoded as another stream of notes sounding gestures received via the communications interface directly or indirectly from a remote device.

In some embodiments, the portable computing device is selected from the group of: a compute pad, a game controller, a personal digital assistant or book reader, and a mobile phone or media player.

In some embodiments in accordance with the present invention(s), a computer program product is encoded in one or more media and includes instructions executable on a processor of the portable computing device to cause the portable computing device to perform the method. In some cases, the media are readable by the portable computing device or readable incident to a computer program product conveying transmission to the portable computing device.

In some embodiments in accordance with the present invention(s), an apparatus includes a portable computing device having a multi-touch sensitive display and machine readable code executable on the portable computing device to implement a synthetic musical instrument. The machine readable code includes instructions executable to capture chord sounding gestures indicated by a user on the multi-touch sensitive display, wherein the capture of chord sounding gestures includes, for particular and respective chords so gestured, registration of contact by multiple fingers of the user's hand and distinguishing between respective geometries of the multiple-finger contacts, wherein the captured chord sounding gestures are characterized by the respective multiple-finger contact geometries rather than solely by positional registrations of individual finger contacts relative to string or fret positions. The machine readable code is still further executable to audibly render the user's performance on the portable computing device using, as an input to a digital synthesis of the synthetic musical instrument executing on the portable computing device, a gesture stream that includes the captured chord sounding gestures, wherein the gesture stream, and not the musical score itself, drives the digital synthesis. In some embodiments the apparatus is embodied as one or more of a compute pad, a game controller, a handheld mobile device, a mobile phone, a personal digital assistant, a media player and a book reader.

In some embodiments in accordance with the present invention(s), a computer program product is encoded in media and includes instructions executable to implement a synthetic multi-string musical instrument on a portable computing device having a multi-touch display interface. The computer program product encodes and includes instructions executable by the portable computing device to capture chord sounding gestures indicated by a user on the multi-touch sensitive display, wherein the captured chord sounding gestures include, for particular and respective chords so gestured, contact by multiple fingers of the user's hand and wherein the captured chord sounding gestures are characterized by respective geometries of the multiple-finger contacts rather than solely by positional registrations of individual finger contacts relative to string or fret positions. The instructions are executable by the portable computing device to distinguish between respective of the multiple-finger contact geometries gestured by the user and based thereon to pass a stream of chord indicative inputs to a digital synthesis of the multi-string musical instrument executing on the portable computing device. In addition, the instructions are executable by the portable computing device as the digital synthesis to audibly render a performance in correspondence with the stream of captured chord indicative gestures.

In some embodiments, the instructions are executable by the portable computing device to distinguish between respective of the multiple-finger contact geometries, include instruction sequences to distinguish two-, three- and four-touch gestures. In some embodiments, the instructions are executable by the portable computing device to capture chord sounding gestures capture both multi-touch chord selection gestures and a traveling-touch, strum-type gesture.

In some embodiments, the computer program product further includes instructions executable to determine correspondence of respective captured chord sounding gestures with the chord selections visually cued in the sounding zone and to grade the user's performance based on the determined correspondences. In some case, the media are readable by the portable computing device or readable incident to a computer program product conveying transmission to the portable computing device.

Score Coded Performance Effect Cues

In some embodiments in accordance with the present invention(s), a method includes using a portable computing device as a multi-string synthetic musical instrument and presenting a user of the synthetic musical instrument with visual cues on a multi-touch sensitive display of the portable computing device. The presented visual cues are indicative of temporally sequenced note selections to be sounded by the user in accord with a musical score, wherein notwithstanding multi-string nature of the synthetic musical instrument, the presentation of the visual cues is piano roll style, wherein individual visual cues travel toward pitch indicative positions along a laterally extended sounding zone of the multi-touch sensitive display, and wherein at least one of the presented visual cues indicates a string bend performance effect to be sounded by the user in accord with the musical score. The method further includes capturing note sounding gestures indicated by the user using the multi-touch sensitive display and audibly rendering the performance on the portable computing device using the captured gesture stream as an input to a digital synthesis of the synthetic musical instrument executing on the portable computing device, wherein the captured gesture stream, and not the musical score itself, drives the digital synthesis. In some cases, the captured note sounding gestures include finger contacts at pitch selective positions along the laterally extended sounding zone.

In some embodiments, the captured note sounding gestures for the string bend performance effect include finger contact and in-contact travel on the multi-touch sensitive display in a direction generally orthogonal to lateral extent of the sounding zone. In some cases, the audible rendering in correspondence with a captured string bend indicative gesture varies pitch from an initial pitch to a pitch corresponding to a note selection coded in the musical score. In some cases, the audible rendering in correspondence with a captured string bend indicative gesture varies pitch from a pitch corresponding to a note selection coded in the musical score.

In some embodiments, lateral extent of the note sounding zone is dynamically allocated so that pitch range of available notes and spacing between note selective positions distributes a current contextually relevant set of note sounding positions along the available lateral extent of a multi-touch sensitive display. In some embodiments, the captured note sounding gestures include, for a particular chord visually cued in accordance with the musical score, contact by multiple fingers of the user's hand.

In some embodiments, the method further includes distinguishing between plural multi-finger contact geometries as chord indicative gestures and, in correspondence with a captured chord indicative gesture, audibly rendering a corresponding multi-string chord using the digital synthesis.

In some cases, at least one of the presented visual cues indicates a vibrato performance effect in accord with the musical score; and the method further includes capturing and including a vibrato indicative gesture in the gesture stream supplied as input to the digital synthesis of the synthetic string instrument executing on the portable computing device. In some cases, capture of the vibrato indicative gesture uses an on-board accelerometer of the portable computing device.

In some embodiments, the method further includes determining correspondence of respective captured note sounding gestures with the note selections visually cued in the sounding zone and grading the user's performance based on the determined correspondences. In some cases, the determined correspondences include: a measure of temporal correspondence of a particular note sounding gesture with arrival of a visual cue in the sounding zone; and a measure of note selection correspondence of the particular note sounding gesture with the visual cue. In some cases, the determined correspondences include a measure of temporal correspondence of the string bend performance effect with arrival of the corresponding visual cue in the sounding zone.

In some embodiments, the synthetic multi-string instrument is a guitar, and the visual cues travel across the multi-touch sensitive display and represent, in one dimension of the multi-touch sensitive display, desired finger contacts along a fretless single-string analog of the multi-string instrument in accordance with notes of the score and, in a second dimension generally orthogonal to the first, temporal sequencing of the desired finger contacts paced in accord with a current tempo.

In some cases, the sounding zone corresponds generally to a generally linear display feature on the multi-touch sensitive display toward or across which the visual cues travel. In some cases, the captured note sounding gestures are indicative of both string excitation and pitch selection for the excited string.

In some embodiments, the method further includes presenting on the multi-touch sensitive display a lesson plan of exercises, wherein the captured note selection gestures correspond to performance by the user of a particular one of the exercises and advancing the user to a next exercise of the lesson plan based on a grading of the user's performance of the particular exercise.

In some embodiments, the portable computing device includes a communications interface, and the method further includes transmitting an encoded stream of the note selection gestures via the communications interface for rendering of the performance on a remote device.

In some embodiments, the method further includes geocoding the transmitted gesture stream and displaying a geographic origin for, and in correspondence with audible rendering of, another user's performance encoded as another stream of notes sounding gestures received via the communications interface directly or indirectly from a remote device.

In some cases, the audible rendering includes modeling acoustic response for the multi-string instrument and driving the modeled acoustic response with inputs corresponding to the captured note sounding gestures. In some cases, the portable computing device is selected from the group of: a compute pad, a game controller, a personal digital assistant or book reader, and a mobile phone or media player.

In some embodiments, a computer program product is encoded in one or more media and includes instructions executable on a processor of the portable computing device to cause the portable computing device to perform one or more of the aforementioned methods. In some cases, medium or media is (are) readable by the portable computing device or readable incident to a computer program product conveying transmission to the portable computing device.

In some embodiments in accordance with the present invention, an apparatus includes a portable computing device having a multi-touch display interface and machine readable code executable on the portable computing device to implement a synthetic musical instrument. The machine readable code includes instructions executable to present a user of the synthetic musical instrument with visual cues on the multi-touch sensitive display. The presented visual cues are indicative of temporally sequenced note selections to be sounded by the user in accord with a musical score, wherein notwithstanding multi-string nature of the synthetic musical instrument, the presentation of the visual cues is piano roll style, wherein individual ones of the visual cues travel toward pitch indicative positions along a laterally extended sounding zone of the multi-touch sensitive display. At least one of the presented visual cues indicates a string bend performance effect to be sounded by the user in accord with the musical score. The machine readable code is further executable to capture note sounding gestures indicated by the user using the multi-touch sensitive display and to audibly render the performance on the portable computing device using the captured gesture stream as an input to a digital synthesis of the synthetic musical instrument executing on the portable computing device, wherein the captured gesture stream, and not the musical score itself, drives the digital synthesis.

In some embodiments, the machine readable code is further executable to vary (in correspondence with a captured string bend indicative gesture) an audibly rendered pitch to or from a pitch corresponding to a note selection coded in the musical score. In some embodiments, the machine readable code is further executable to distinguish between plural multi-finger contact geometries as chord indicative gestures and to audibly render (in correspondence with a captured chord indicative gesture) a corresponding multi-string chord using the digital synthesis. In some cases, the apparatus is embodied as one or more of a compute pad, a handheld mobile device, a mobile phone, a personal digital assistant, a smart phone, a media player and a book reader.

In some embodiments in accordance with the present invention, a computer program product is encoded in media and includes instructions executable to implement a synthetic multi-string musical instrument on a portable computing device having a multi-touch display interface. The computer program product encodes and includes instructions executable by the portable computing device to present a user of the synthetic musical instrument with visual cues on the multi-touch sensitive display, the presented visual cues indicative of temporally sequenced note selections to be sounded by the user in accord with a musical score, wherein notwithstanding multi-string nature of the synthetic musical instrument, the presentation of the visual cues is piano roll style, wherein individual ones of the visual cues travel toward pitch indicative positions along a laterally extended sounding zone of the multi-touch sensitive display, and wherein at least one of the presented visual cues indicates a string bend performance effect to be sounded by the user in accord with the musical score. The computer program product further encodes and includes instructions executable by the portable computing device to capture note sounding gestures indicated by the user using the multi-touch sensitive display and instructions executable by the portable computing device to audibly render the performance on the portable computing device using the captured gesture stream as an input to a digital synthesis of the synthetic musical instrument executing on the portable computing device, wherein the captured gesture stream, and not the musical score itself, drives the digital synthesis.

In some embodiments, the computer program product further includes and encodes instructions executable to determine correspondence of respective captured note sounding gestures with the note selections visually cued in the sounding zone and to grade the user's performance based on the determined correspondences. In some cases, the medium or media is (are) readable by the portable computing device or readable incident to a computer program product conveying transmission to the portable computing device.

These and other embodiments in accordance with the present invention(s) will be understood with reference to the description herein as well as the drawings and appended claims which follow.

BRIEF DESCRIPTION OF THE DRAWINGS

The present invention is illustrated by way of example and not limitation with reference to the accompanying figures, in which like references generally indicate similar elements or features.

FIG. 1 depicts an individual performance use and FIG. 2 depicts note sequences (including a string bend effect) visually cued in accordance with a musical score.

FIGS. 3A, 3B and 3C illustrate spatio-temporal cuing aspects of a user interface design for a synthetic guitar instrument in accordance with some embodiments of the present invention. Note that frame of reference is rotated by 180 degrees from that illustrated in FIGS. 1 and 2 to instead present a view typical of that presented to the user musician. Accordingly, in the frame of reference illustrated in FIGS. 3A, 3B and 3C, note cues travel upward on the illustrated page and string bending gestures cue finger contact that travels downward on the illustrated page.

FIG. 5 depicts an individual performance use and FIG. 6 illustrates and annotates a chord selection gesture (a C major chord) and a strum gesture on a multi-touch sensitive display of the portable computing device.

FIGS. 7A, 7B and 7C illustrate and annotate several variations on a chord selection gesture (here a G major chord) to emphasize that, in accordance with some embodiment of the present invention(s), the multi-touch selection gesture for a given chord may be characterized by general shape and general orientation, rather than with reference to any precise positional registration with string or fret positions on screen. FIG. 7D illustrates and annotates one presentation of the G major chord selection gesture on a multi-touch sensitive display of a portable computing device. FIG. 7E illustrates and annotates one presentation of the D major chord selection gesture on a multi-touch sensitive display of the portable computing device.

Figure 1:
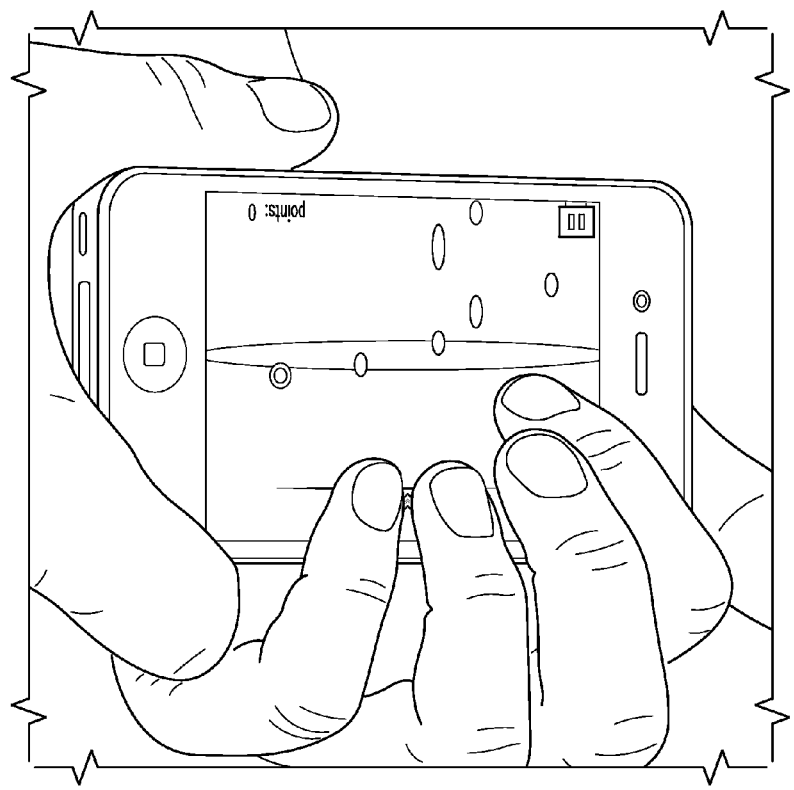
FIGS. 1 and 2 depict performance uses of a portable computing device hosted implementation of a synthetic guitar in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DETAILED DESCRIPTION

In the description that follows, we detail certain exemplary implementations of synthetic multi-string musical instruments. In doing so, we use a familiar 6-string guitar as a teaching example for implementations in accordance with some embodiments of the present invention(s). Specifically, and withstanding the multi-string nature of certain instruments that may be synthesized, alternative visual cuing and gesture expression models have been found to be more suitable for the limited touch-screen real-estate provided by mobile handheld devices such as phones, media players, gaming controllers, etc., at least in some cases or modes of operation. Accordingly, a "piano roll" style set of visual cues has been adopted to provide a song-mode user of a synthetic guitar-type (multi-string) musical instrument with note and/ or chord selection cues (in accordance with a musical score). Thus, the visual cuing and note expression gesture model for a multi-string fretted instrument can rationalized and simplified to a laterally extended note sounding zone, without regard to fretted quantization of pitches or allocations to respective strings.

The synthetic multi-string musical instrument captures a stream of expressive gestures indicated on a multi-touch sensitive display for note/chord soundings and associated performance effects and embellishments. While the visual cues are driven by a musical score and revealed/advanced at a current performance tempo, it is the user's gestures that actually drive the audible performance rendering. Opportunities for user expression (or variance from score) include onset and duration of note soundings, tempo changes, as well as uncued string bend effects, vibrato, etc.

By using a fretless, laterally extended note sounding zone, lateral extent can be dynamically allocated so that the pitch range of available notes (and spacing between note selective positions) can be allocated to laterally distribute a current contextually relevant set of note sounding positions along the available lateral extent of a multi-touch sensitive display. In general, range and/or spacing may be dynamically selected based a note set employed in a current song selection or portion thereof. In this way, visual cues and user note sounding gestures may be distributed across the multi-touch sensitive display in a manner that makes it easier for the user musician to play. The synthetic guitar may allocate finger space to each note, but need only allocate space for the note set that is necessary to play the current selection or song (or to play at a current point within a current selection or song).

Particularly in freestyle modes of play, it is possible to provide users with a gesturing mechanism to sound chords without having to register precisely accurate multi-touch screen contacts. This is especially important for mobile phone, media player and game controller embodiments, where there is generally limited real-estate to display six (6) or more strings, and user fingers are generally too fat to precisely contact such strings. Instead, for a given key and context, most of the important chords have a distinguishing "shape" and location in terms of the fingers that contact the strings and strings that are contacted. These and other aspects will be understood based on specific implementations, embodiments, and teaching examples that follow. Notwithstanding, reliance on a conventional 6-string guitar as an exemplary physical world analogue for certain concrete realizations of synthetic multi-string musical instruments described herein, it will be understood that inventions described and claimed are not limited to any particular musical instrument, let alone to implementations that provide a synthetic 6-string guitar.

Figure 2:
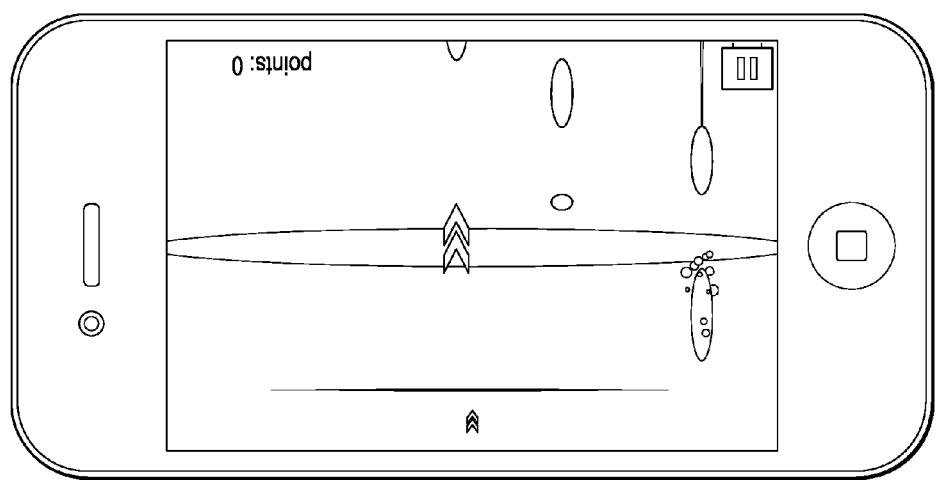

FIGS. 1 and 2 depict performance uses of a portable computing device hosted implementation of a synthetic guitar in accordance with some embodiments of the present invention. FIG. 1 depicts an individual performance use and FIG. 2 depicts note sequences (including a string bend effect) visually cued in accordance with a musical score. In the illustrated frame of reference, visual cues descend toward a sounding zone, where user fingerings (e.g., touch screen contacts) are captured as indicative gestures to trigger the sounding or voicing notes that (depending on facility of the user musician) generally correspond to visual cues and underlying musical score.

FIGS. 3A, 3B and 3C illustrate spatio-temporal cuing aspects of a user interface design for a synthetic guitar instrument in accordance with some embodiments of the present invention. Note that frame of reference is rotated by 180 degrees from that illustrated in FIGS. 1 and 2 to instead present a view typical of that presented to the user musician. Accordingly, in the frame of reference illustrated in FIGS. 3A, 3B and 3C, note cues travel upward on the illustrated page and string bending gestures cue finger contact that travels downward on the illustrated page.

More specifically, FIG. 3A illustrates temporally sequenced note cues presented, at a current tempo, in correspondence with an underlying musical score. In general, higher pitched notes soundable by the synthetic guitar present as visual cues toward the right side of the illustrated screen shots, while lower pitched notes present as visual cues toward the left side. One of the note cues (note cue 311) is in the sounding zone 301, suggesting to the user musician that (based on the current target tempo) the corresponding note is to be sounded by finger contact indicative of string excitation. Timing, attack and duration of the actual finger contact gesture drive digital synthesis and, accordingly, the audible rendering. Lateral position of the actual finger contact can affect the sounded pitch, although in some cases, embodiments or modes, lateral variance from the visually cued note sounding position may be tolerated or ignored altogether. Successive note cues 312, 313, 314 and 315 (in correspondence with the musical score) are depicted along their travel paths toward the sounding zone. One of those successive note cues (the arrow-type cue) cues a string bend to (or from) a score coded note selection.

FIG. 3B illustrates a note cue 321 that includes a string bend performance effect indication suggestive to the user (as visual cuing) of a further string (or pitch) bend performance effect to be sounded by the user musician relative to the visually cued note. To sound the string bend performance effect, the user musician, after contacting the multi-touch sensitive display, transits his/her finger contact in a direction generally orthogonal to the sounding zone to gesture a string bend. In correspondence with the string bend gesture, digital synthesis effectively varies tension of the modeled vibrating string or, in the case of a wave table synthesis, resampling, interpolation and cross-fading may be employed to effectuate a pitch shift in the audible rendering. A visual indication 322 on screen provides additional feedback to the user musician.

Finally, FIG. 3C illustrates temporal and pitch indicative axes of the visual cuing model and lateral extent of the note sounding zone. Lateral extent of the note sounding zone is dynamically allocable to a current pitch range of available notes and spacing between note selective positions. More specifically, the synthetic guitar distributes a current contextually relevant set of note sounding positions along the available lateral extent of the multi-touch sensitive display. In this way, limited display and finger contact real estate may be allocated to visual cuing and gesture capture.

Although illustrations of FIGS. 3A, 3B and 3C focus on individual note cues and sounding gestures, it will be understood that (in some cases, embodiments or modes) captured note sounding gestures may include, for a particular chord visually cued in accordance with the musical score, contact by multiple fingers of the user's hand. Chord sounding gesture capture is contemplated and described in greater detail elsewhere herein, but adaptations of the above-described techniques to score-coded and visually cued chord soundings will be understood by persons of ordinary skill in the art having access to the present disclosure.

Figure 4:
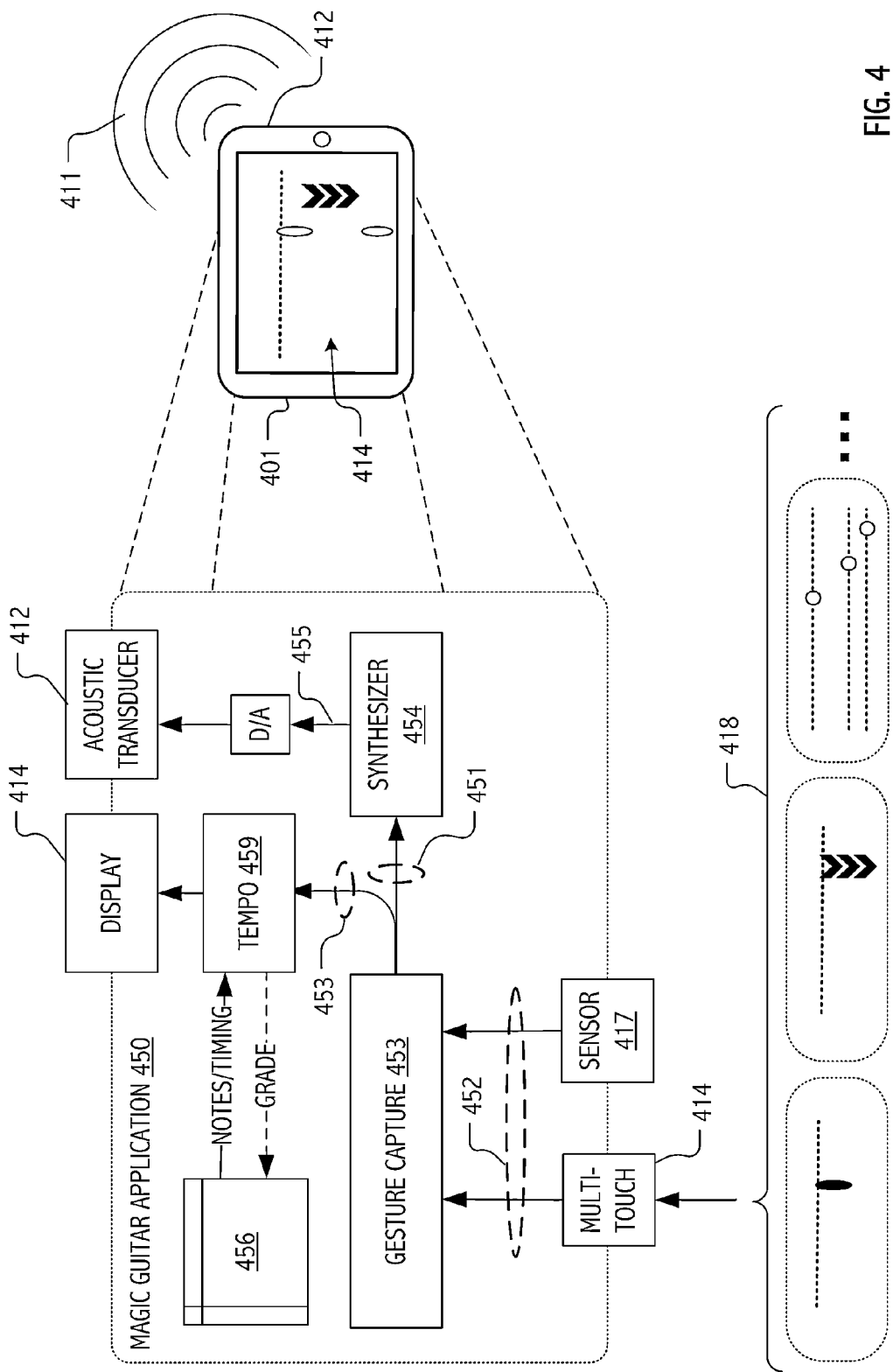
FIG. 4 is a functional block diagram that illustrates capture and encoding of user gestures corresponding to a sequence of note and/or chord soundings in a performance on a synthetic guitar-type musical instrument, together with acoustic rendering of the performance in accordance with some embodiments of the present invention.

FIG. 4 is a functional block diagram that illustrates capture of user gestures corresponding to a sequence of note and/or chord sounding cues in a performance on a synthetic guitar-type musical instrument (e.g., Magic Guitar Application 450 executing on portable computing device 401), together with acoustic rendering of the performance in accordance with some embodiments of the present invention. Note or chord soundings gestured by the user musician at touch screen/display 414 of portable computing device 401 are typically (at least in some modes of operation and for some user musicians) in correspondence with visually presented note cues on touch screen/display 414 and are, in turn, captured (453) and used to drive a digital synthesis (454) of acoustic response of the synthetic guitar. Such visual cues (recall FIGS. 3A, 3B, 3C) are supplied in accordance with a musical score (notes, chords, meter and performance effects and embellishments) stored at least transiently in storage 456 and at a rate that is based on a current tempo. In some embodiments that rate may be continuously adapted (using a tempo control 459) based on techniques described relative to a synthetic piano-type multi-string musical instrument in commonly-owned, co-pending U.S. patent application Ser. No. 13/664,939, filed Oct. 31, 2012, entitled "SYNTHETIC MUSICAL INSTRUMENT WITH PERFORMANCE-AND/OR SKILL-ADAPTIVE SCORE TEMPO" and naming Hamilton, Chaudhary, Lazier and Smith as inventors. Application Ser. No. 13/664,939 is incorporated by reference herein.

In other embodiments or modes, tempo of note or chord cues may remain generally fixed in accord with a musical score, though typically allowing (in some cases or embodiments) for a stall in cases where the user musician fails to effectuate a responsive note or chord sounding gesture on touch screen/display 414. As will be also be appreciated based on the present description, in some embodiments or modes of operation, note and/or chords may be sounded in freestyle modes or otherwise without regard to a score-coded sequence. In each case, note or chord sounding gestures (rather than elements of the score itself) drive the digital synthesis (e.g., here of a 6-string guitar). For purposes of understanding suitable implementations, any of a wide range of digital synthesis techniques may be employed to drive audible rendering (411) of the user musician's performance via a speaker or other acoustic transducer (412) or interface thereto.

In general, the audible rendering can include synthesis of tones, overtones, harmonics, perturbations and amplitudes and other performance characteristics based on the captured gesture stream. Note that as used herein the captured gesture stream will be broadly understood and may encompass a multiplicity of gestures and gesture types such as, for example, single string note soundings such as might be expressed (on a physical instrument analogue) by the combined actions of a finger down position on a fret board and a pluck of the shortened string. In some cases or embodiments, particularly relative to user interface designs of the type illustrated with respect to a single string, piano roll-style user interface such as illustrated above relative to FIGS. 3A, 3B and 3C, the user gesture analogues of selection and sounding may be conflated in the gesture notation and capture. In such cases, an expressed and captured touch gesture may sound and select a particular note.

Likewise, in certain chord sounding gesture implementations described in the sections that follow, chord selection and sounding may be conflated. Nonetheless, it is to be understood that, more generally and in some cases, modes or embodiments, selection and sounding of a note or chord may be expressed as separate (though typically coordinated) gestures. For example, by a collection of finger contacts of one hand on multi-touch sensitive display 414 a user musician may gesture a chord selection and with a further travelling-touch gesture using a finger of the other hand may gesture a "strum" that together with the selection will be understood to constitute a chord sounding gesture or gestures. Note that, in some cases, embodiments or modes, an automatic strum may be provided for the user musician and introduced into the gesture stream based on score-coded meter. Furthermore, some embodiments may support ornamentation gestures such as the previously described string bend gesture or, for example, a vibrato gesture expressed by the user musician as shaking detected by an accelerometer or other sensor 417 of portable computing device 401.

In each case, the gesture stream drives the digital synthesis 454 which in turn may be rendered. In some cases, an audible rendering is on the very device on which the musical performance is captured. In some situations or embodiments, the gesture stream encoding is conveyed to a remote device whereupon an audible rendering converts a synthesized signal to acoustic energy. In some cases, an appropriate CODEC is employed to suitably encode the resulting audio rendering for storage and/or transmission.

The digital synthesis (454) of a 6-string guitar (or multi-string musical instrument) allows the user musician to control an actual expressive model (whether by wavetable synthesis, physical acoustic modeling or otherwise) using multi-sensor interactions as inputs. Note that digital synthesis (554) is, at least for full synthesis modes, driven by the user musician's note sounding gestures, rather than by mere tap triggered release of the next score coded note. In this way, the user is actually causing the sound and controlling the timing, decay, pitch, quality and other characteristics of notes (including chords) sounded. A variety of computational techniques may be employed and will be appreciated by persons of ordinary skill in the art. For example, exemplary techniques include wavetable or FM synthesis.

Wavetable or FM synthesis is generally a computationally efficient and attractive digital synthesis implementation for piano-type musical instruments such as those described and used herein as primary teaching examples. However, and particularly for adaptations of the present techniques to syntheses of certain types of multi-string instruments (e.g., unfretted multi-string instruments such as violins, violas cellos and double bass), physical modeling may provide a livelier, more expressive synthesis that is responsive (in ways similar to physical analogs) to the continuous and expressively variable excitation of constituent strings. For a discussion of digital synthesis techniques that may be suitable in other synthetic instruments, see generally, commonly-owned co-pending application Ser. No. 13/292,773, filed Nov. 11, 2011, entitled "SYSTEM AND METHOD FOR CAPTURE AND RENDERING OF PERFORMANCE ON SYNTHETIC STRING INSTRUMENT" and naming Wang, Yang, Oh and Lieber as inventors, which is incorporated by reference herein.

Chord Sounding Gesture Capture

In some embodiments and particularly in freestyle modes of play, it is possible to provide users with a gesturing mechanism to sound chords without having to register precisely accurate multi-touch screen contacts. This is especially important for mobile phone, media player and game controller embodiments, where there is generally limited real-estate to display six (6) or more strings, and user fingers are generally too fat to precisely contact such strings. Instead, for a given key and context, most of the important chords will be understood to have a distinguishing "shape," orientation and coarse-grain position in terms of the fingers that contact the strings and strings that are contacted. Based on such shapes, orientations and course positionings, a chord gesturing framework and capture techniques have been developed that has been found to be reasonably intuitive for user musicians and amateurs alike, but also largely independent of an precise positional or scaling requirements for touches relative to string, fret positions or each other.

The basic concept is that for a given key and context, most of the important chords have a distinguishable "shape" and location in terms of the fingers that contact the strings and which strings are contacted. By recognizing in multi-touch gesture capture, that an E major chord is gestured as an obtuse triangle of finger contacts at the top of the strings (screen), an A minor chord has the same shape but is lower on the screen, an A major chord is gestured as a linear arrangement of finger contacts near the bottom of the screen, a C major chord is gestured as an upward diagonal arrangement of finger contacts at the center of the screen, and a D major chord is gestured as a nearly equilateral triangle of finger contacts at the bottom of the screen, etc., it is possible to reliably guess at the most likely chord sounding expressed by the user. The user doesn't have to hit strings and frets exactly. Indeed, positional registration along respective string display artifacts need not matter at all, or can a little but not as critically as real frets. Rather, the user may simply gesture finger contacts in roughly the right shape at roughly the right portion of the screen. Gesture recognition and capture algorithm(s) identify the sounded chord and supply appropriate gesture-driven inputs to a multi-string synthesis. In some embodiments, strings are displayed or dynamically revealed beneath the finger contacts in correspondence with the recognized chord to visually reinforce the chord indication.

Figure 5:
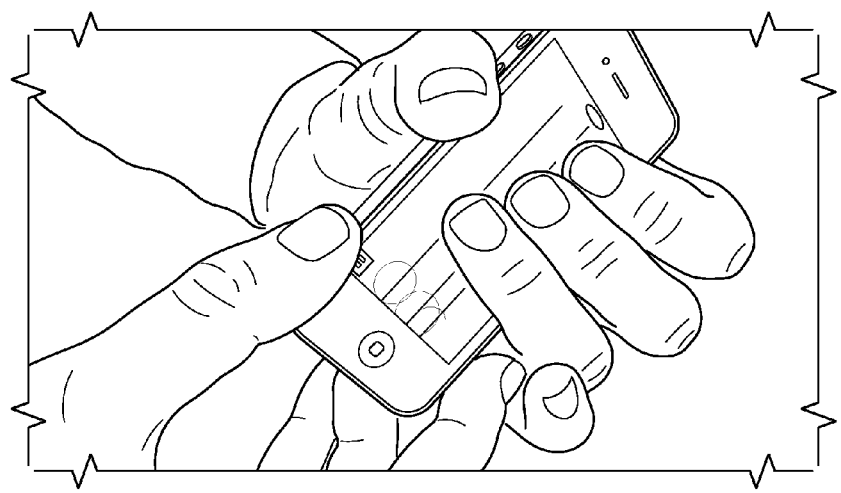
FIGS. 5 and 6 depict performance uses of a portable computing device hosted implementation of a synthetic guitar in accordance with some embodiments of the present invention in which chord gesturing is supported.
Figure 6:
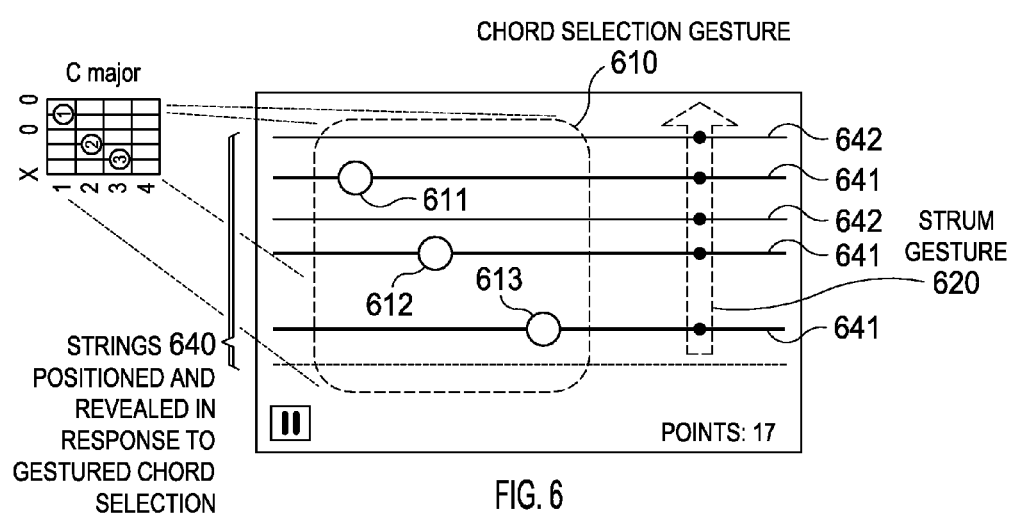

In FIGS. 5 and 6, we depict performance uses of a portable computing device (e.g., portable computing device 401, recall FIG. 4) hosting and executing a synthetic software implementation of a six (6) string guitar (e.g., as Magic Guitar Application 450) in accordance with some embodiments of the present invention in which chord gesturing is supported. Specifically, FIG. 5 depicts an individual performance use in which a three-touch chord indicative gesture has been distinguished by the synthetic multi-string instrument as a C major chord and corresponding constituent strings of the chord have been presented (on display) generally beneath the actual touch points. Accordingly, spacing of the displayed strings is scaled (in some cases non-uniformly) and positioning of collection of strings in the vertical dimension (i.e., vertical from a user-musician perspective consistent with the view of FIG. 5) correspond to the actual user gesturing. A travelling touch strum gesture expressed using the index finger of the user-musician's right hand as (in conjunction with the captured chord selection) been processed as a sounding of the C major chord. Of course, as explained elsewhere herein, the chord sounding may be gestured as a two-part gesture (selection and sounding as just described) or alternatively the strum may be synthetic (e.g., automatically generated accord with score-coded meter to sound whatever notes and/or chords are currently selected) or simply implicit in (and therefore conflated with) the multi-touch selection of the particular chord.

FIG. 6 illustrates and annotates a simplified screen image corresponding to the chord selection gesture 610 (for a C major chord) as just explained together with a strum gesture 620 on a multi-touch sensitive display of the portable computing device. A generally linear three-touch arrangement of finger contacts 611, 612 and 613 is distinguished as the C major chord illustrated, notwithstanding what would be somewhat imprecise correspondence of touch points to string and fret positions were they represented by the synthetic multi-string instrument conventionally as fixed positional registrations. Note that strings 640 are positioned and revealed beneath actual touch points in response the chord sounding gesture. In the illustration of FIG. 6, in addition to those strings selected in correspondence with the touch points (strings 641) remaining strings including open strings 642 are revealed. Optionally, and in some situations, modes or embodiments, only the selected strings 641 may be revealed. Note that the strings revealed (including the remaining unselected strings) are adaptively positioned and spaced in correspondence with the actual string selection touch points. As a result, strings 640 need not be equally spaced. Consistent with a physical 6-string guitar analogue, open string tunings (which can be set based on tuning of the instrument) sound at pitches that are used in the chord. Alternatively, tunings for the open strings 642 can be dynamically adapted (in the synthetic multi-string instrument) to the sounded chord. Based on quality of the chord sounding gesture expression (e.g., timing of onset or strumming relative to a score, sustenance of the selection gesture, expressed vibrato or other ornamentation), points may be optionally awarded in skill demonstration or game play mode.

FIGS. 7A, 7B and 7C illustrate and annotate several variations (710, 710B and 710C) in the touch point expression of a chord selection gesture (here a G major chord) to emphasize that, in accordance with some embodiments of the present invention(s), the multi-touch selection gesture for a given chord may be characterized by general shape and general orientation, rather than with reference to any precise positional registration with string or fret positions on screen. Specifically, FIG. 7A illustrates a near ideal abstraction of the finger positioning for a G major chord as an upward (along strings) pointing triangle of touch points 711, 712 and 713. FIG. 7B illustrates a somewhat tighter spacing of touch points with a slight counterclockwise rotation from the near ideal. Notwithstanding the differing coordinates of the 710B variant touch points 711, 712 and 713, the synthetic multi-string instrument recognizes the general shape and orientation features that distinguish the G major chord selection/sounding gesture. Likewise, FIG. 7C illustrates still another spacing of touch points, this time more closely approximating an arrangement that might be gestured by an experienced guitar player given its better correspondence with string and fret spacings that would appear in a physical instrument analogue. Notwithstanding the differing coordinates of the 710C variant touch points 711, 712 and 713 from the idealized abstraction, the synthetic multi-string instrument again recognizes the general shape and orientation features that distinguish the G major chord selection/sounding gesture.

FIG. 7D illustrates and annotates one presentation (an idealized abstraction 710 of the G major chord selection/sounding gesture) on a multi-touch sensitive display of a portable computing device. As before, generally upward-pointing (in string direction) triangular three-touch arrangement of finger contacts 711, 712 and 713 is distinguished as the G major chord illustrated, notwithstanding what would be somewhat imprecise correspondence of touch points to string and fret positions were they represented by the synthetic multi-string instrument conventionally as fixed positional registrations. As before, strings (here strings 740) are positioned and revealed beneath actual touch points in response the chord sounding gesture. In addition to those strings selected in correspondence with the touch points remaining strings including open strings are revealed and, consistent with a non-uniform string spacing rationalizable with the particular expression of the G major chord selection/sounding gesture abstraction, three open strings are packed between touch points 711 and 713. Again optionally, and in some situations, modes or embodiments, only the selected strings may be revealed. As before, consistent with a physical 6-string guitar analogue, open string tunings (whose tuning can be set based on tuning of the instrument) sound at pitches that are used in the chord. Alternatively, tunings for the open strings can be dynamically adapted (in the synthetic multi-string instrument) to the sounded chord. Again, based on quality of the chord sounding gesture expression, points may be optionally awarded in skill demonstration or game play mode.

Finally, FIG. 7E illustrates and annotates an abstraction 730 of a D major chord selection/sounding gesture) on a multi-touch sensitive display of a portable computing device. In this case, generally downward-pointing (in string direction) triangular three-touch arrangement of finger contacts 731, 732 and 733 is distinguished as the D major chord illustrated, again notwithstanding what would be somewhat imprecise correspondence of touch points to string and fret positions were they represented by the synthetic multi-string instrument conventionally as fixed positional registrations. As before, strings are positioned and revealed beneath actual touch points in response the chord sounding gesture. In addition to those strings selected in correspondence with the touch points remaining strings including open strings are revealed although, as before and optionally in some situations, modes or embodiments, only the selected strings may be revealed. Again, based on quality of the chord sounding gesture expression, points may be optionally awarded in skill demonstration or game play mode.

Chord Selection Decision Tree and Exemplary Code

Figure 8:
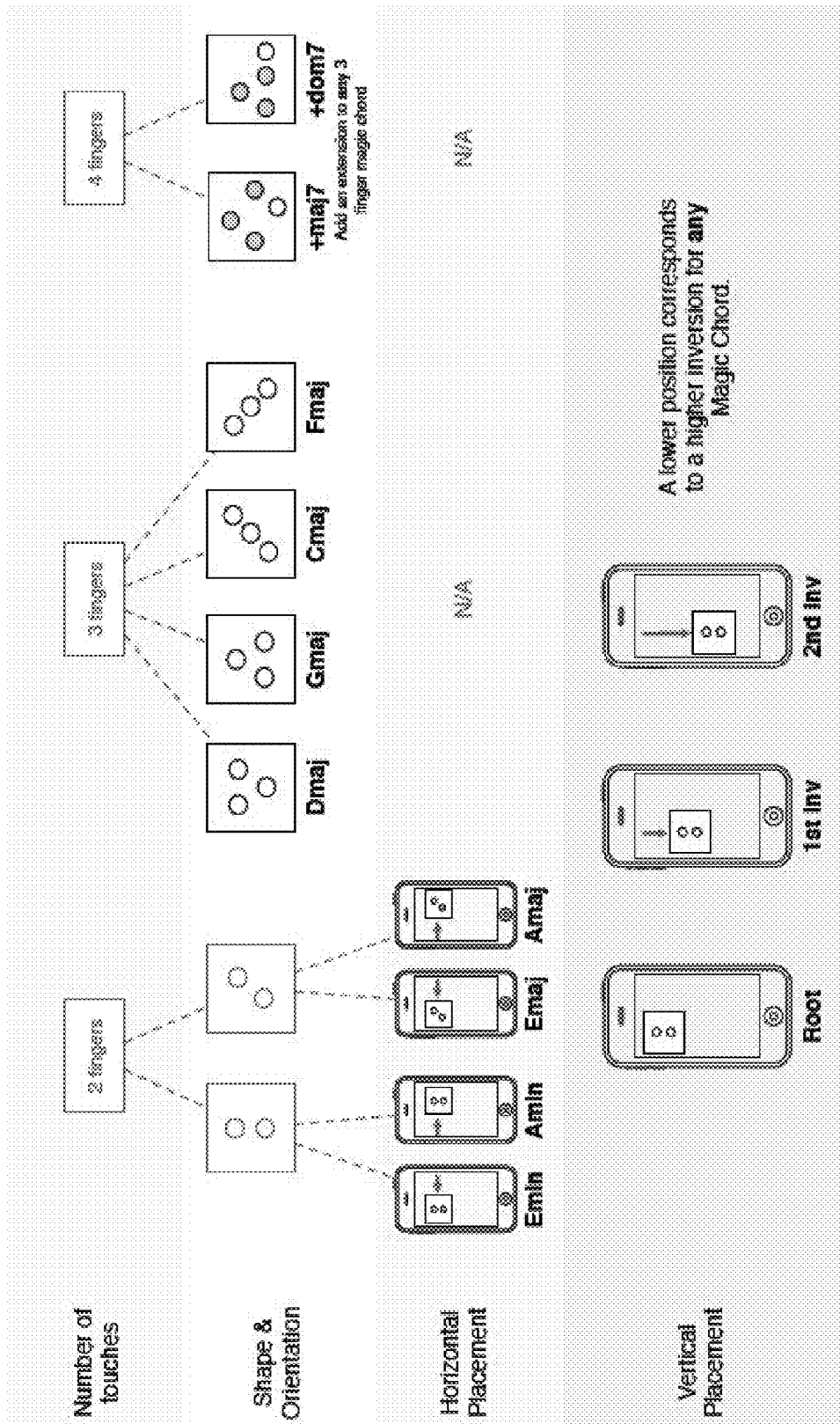
FIG. 8 depicts a decision tree for distinguishing multi-touch chord selection gestures based on number of touches, general shape and orientation and in some cases, horizontal position. Variants for root and successive inversions of gestured chord selections are also depicted.

FIG. 8 depicts a decision tree for distinguishing multi-touch chord selection/sounding gestures based on number of touches, general shape and orientation and in some cases, horizontal position. Variants for root and successive inversions of gestured chord selections are also depicted. In addition to the C major, G major and D major chord selection/sounding gestures explained in detail above relative to screenshots, exemplary expressions of additional chords (including minor chords, major and dominant seventh ($7^{th}$) variations and inversions distinguishable by an exemplary embodiment of a synthetic multi-string musical instrument (e.g., Magic Guitar Application 450 executing on portable computing device 401, recall FIG. 4) are depicted.

To facilitate understanding of exemplary implementations the techniques described herein, the following pseudo-code snippets are provided and are illustrative of an embodiment of gesture capture (see e.g., gesture capture block 453, recall FIG. 4) in which consistent with the decision tree of FIG. 8, multi-touch chord selection gestures are distinguished based on number of touches, general shape and orientation and in some cases, horizontal position. Variants for root and successive inversions of gestured chord selections are also distinguished. The illustrated pseudo-code assumes an array-type data structure allTouches to which a multi-touch API and related services adds elements of touches in the order in which they send a touchesBegan notification. Individual touches are removed from the array when they send a touchesEnded notification and any remainder of the array is packed to the front.

Based on the foregoing, an exemplary two-touch chord sounding (or selection) gestures may be distinguished from one another based on the following touch coordinate based calculations in which both orientation of a line traceable through the touch coordinates and horizontal placement of the horizontal midpoint of the two-touch gesture. Specifically, E minor, A minor, E major and A major chords may be distinguished follows:

```
if( numberOfTouches == 2 ) {
   Point touchA = allTouches[0];
   Point touchB = allTouches[1];
   // check if x similarity is closer than y similarity
   if( abs(touchA.x - touchB.x) < abs(touchA.y - touchB.y) ) {
      // the x points are closer, consider this vertical
      // if the median x is on the left side vs the right side,
      // play a different chord
      if ( median(touchA.x,touchB.x) < ScreenWidth ) {
         setupChord( E_Minor )
      }
      else {
         setupChord( A_Minor )
      }
   }
   else {
      // the y points are closer, consider this diagonal/horizontal
      // if the median x is on the left side vs the right side,
      // play a different chord
      if ( median(touchA.x,touchB.x) < ScreenWidth ) {
         setupChord( E_Major )
      }
      else {
         setupChord( A_Major )
      }
   }
}
```

Likewise, touch coordinates for three-touch chord sounding (or selection) gestures are analyzed to identify features consistent with general shapes and orientations which are, in turn, used to distinguish D major, G major, C major and F major chord indicative gestures from one another.

```
...
else if( numberOfTouches == 3 ) {
   // first order the touches ascending along the x dimension
   // of the screen
   xOrderedTouches = sortInXDimensionAscending( allTouches );
   Point touchA = xOrderedTouches[0];
   Point touchB = xOrderedTouches[1];
   Point touchC = xOrderedTouches[2];
   // now that the points are ordered we can make simple
   // comparisons for shapes
   if ( touchB.y > touchA.y && touchB.y > touchC.y ) {
      // triangle pointed upwards
      setupChord( G_Major )
   }
   else if ( touchB.y <= touchA.y && touchB.y <= touchC.y ) {
      // triangle pointed downwards
      setupChord( D_Major )
   }
   else if ( touchA.y <= touchB.y && touchB.y <= touchC.y ) {
      // line sloping upwards from left to right
      setupChord( C_Major )
   }
   else if ( touchA.y >= touchB.y && touchB.y >= touchC.y ) {
      // line sloping downwards from left to right
      setupChord( F_Major )
   }
}
```

Finally, four-touch chord sounding gesture handling builds on an initial characterization of the main triad or major chord using techniques such as described above relative to the three-touch chords. From there, the touch coordinates for successive fourth-touch can be compared to coordinates for the constituent touches of the already characterized three-touch main triad. Based on the position of the fourth touch relative to the other constituents, major and dominant $7^{th}$ variants (or extensions) of the major chord may be distinguished as follows:

```
...
else if( numberOfTouches == 4 ) {
   // *** start off with identical code to numberOfTouches == 3 to
   set up the main triad using first three touch points ***
   ... see above if statement for numberOfTouches == 3 ...
   // get the fourth touch, which we know to be the most recent
   // touch added
   Point touchD = xOrderedTouches[3];
   if ( touchD.x > touchA.x && touchD.x > touchB.x &&
        touchD.x > touchC.x ) // fully to the right
   {
      addExtensionToCurrentChord( dom_7_extension );
   }
   else {
      addExtensionToCurrentChord( maj_7_extension );
   }
}
```

Pseudo code presented herein is meant to provide a high-information content teaching tool for persons of ordinary skill in the art from which may suitable adaptations, specializations, extensions and realizations will be appreciated for particular deployments, coding environments, firmware and API definitions and procedural, objected-oriented, event-driven or other execution environment types. Pseudo code is not meant to limit embodiments in accordance with the present inventions to one particular coding style or expression of the functional decomposition and inventive techniques embodied therein.

Additional Embodiments and Deployments

Figure 9:
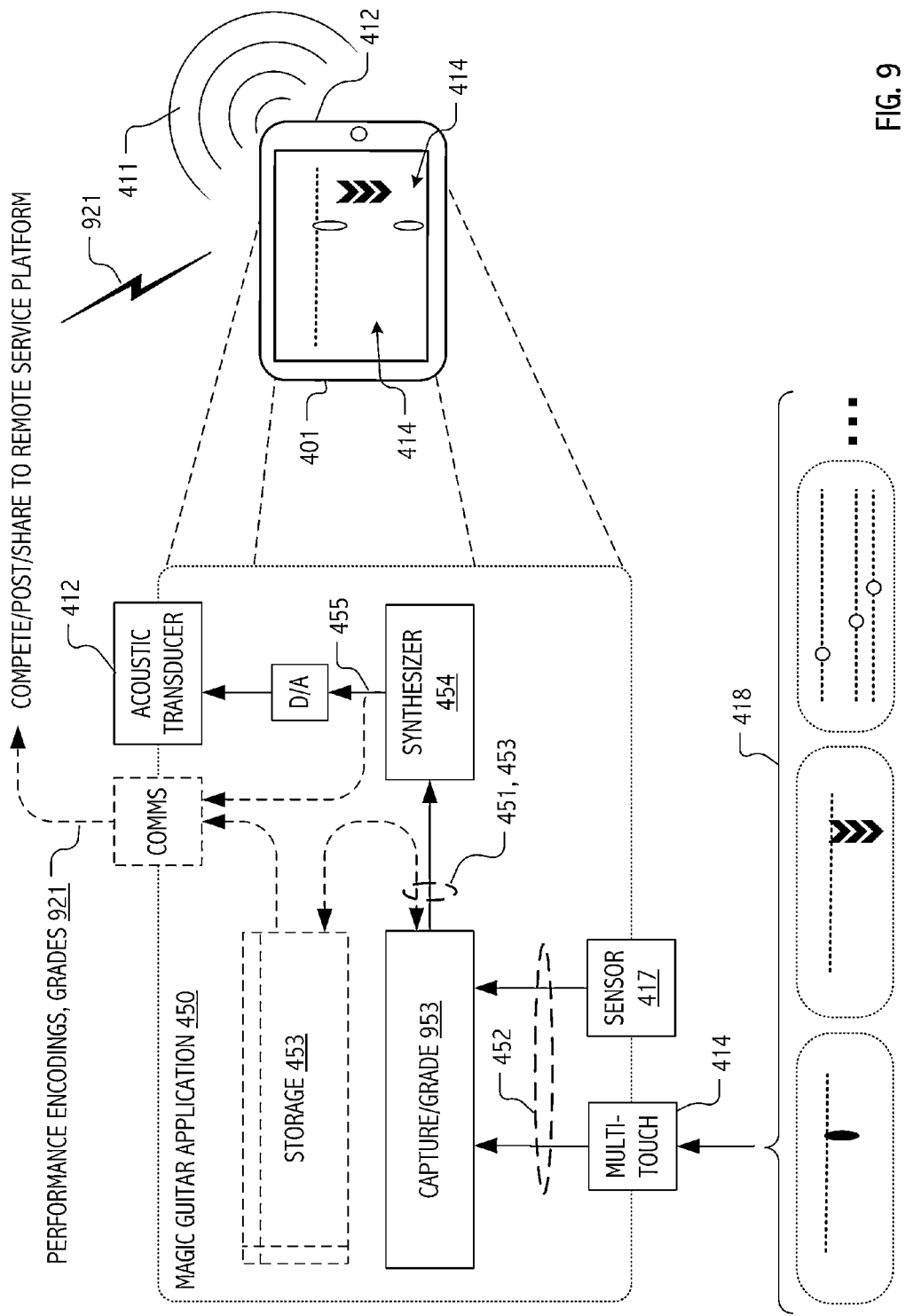
FIG. 9 is a functional block diagram that further illustrates, in addition to gesture capture and performance grading (previously described), optional communication of performance encodings and/or grades as part of a game play or competition framework, social network or content sharing facility in accordance with some embodiments of the present invention.

FIG. 9 is a functional block diagram that further illustrates, in addition to gesture capture and performance grading (previously described), optional communication of performance encodings and/or grades as part of a game play or competition framework, social network or content sharing facility in accordance with some embodiments of the present invention. As in the illustration of FIG. 4, an instance of Magic Guitar application 450 executes on portable computing device 401. Note or chord soundings gestured (418) by the user musician at touch screen/display 414 of portable computing device 401 are typically (at least in some modes of operation) somewhat in correspondence with visually presented note cues on touch screen/display 414 and are, in turn, captured and used to drive a digital synthesis (454) of acoustic response of the synthetic guitar. In the illustrated configuration, in addition to distinguishing note and chord sounding gestures so as to provide a gesture stream 451 that drives synthesizer 454, capture/grading block 953 may evaluate quality of the note and/or chord sounding gesture expressions (e.g., timing of onset or strumming relative to a score, sustenance of the selection gesture, expressed vibrato or other ornamentation) and, based thereon, award points for skill demonstration or game play modes. Performance encodings (either as captured gesture streams or encoded audio renderings) and well as point credits or grades may optionally be uploaded to a remote service platform (e.g., by wireless communications 921) to facilitate competition and/or collaboration or to post or share in a social networking environment.

Figure 10:
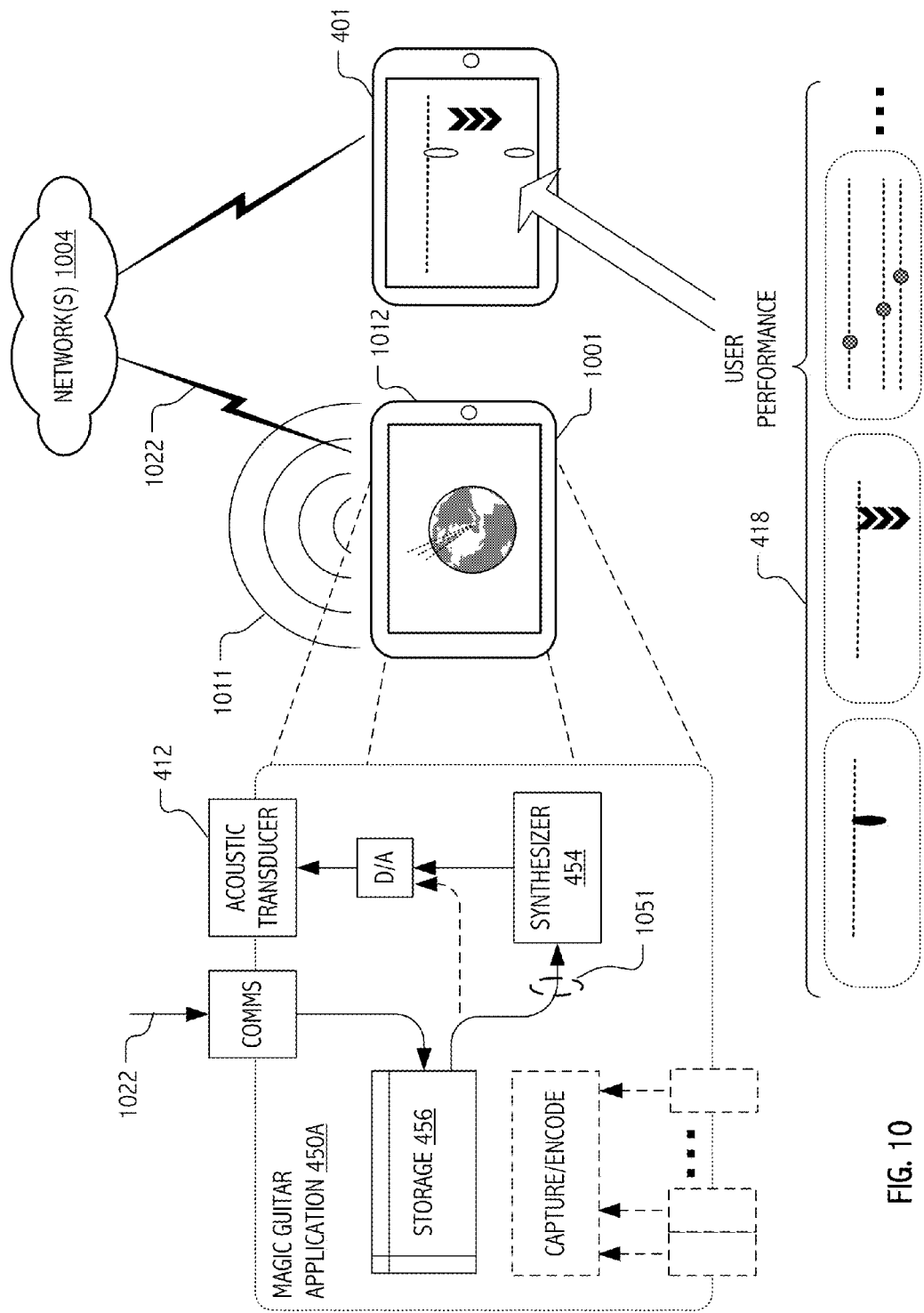
FIG. 10 is a functional block diagram that illustrates capture, encoding and transmission of a gesture stream (or other) encoding corresponding to a user performance on a synthetic multi-string instrument together with receipt of such encoding and acoustic rendering of the performance on a remote device.
Figure 11:
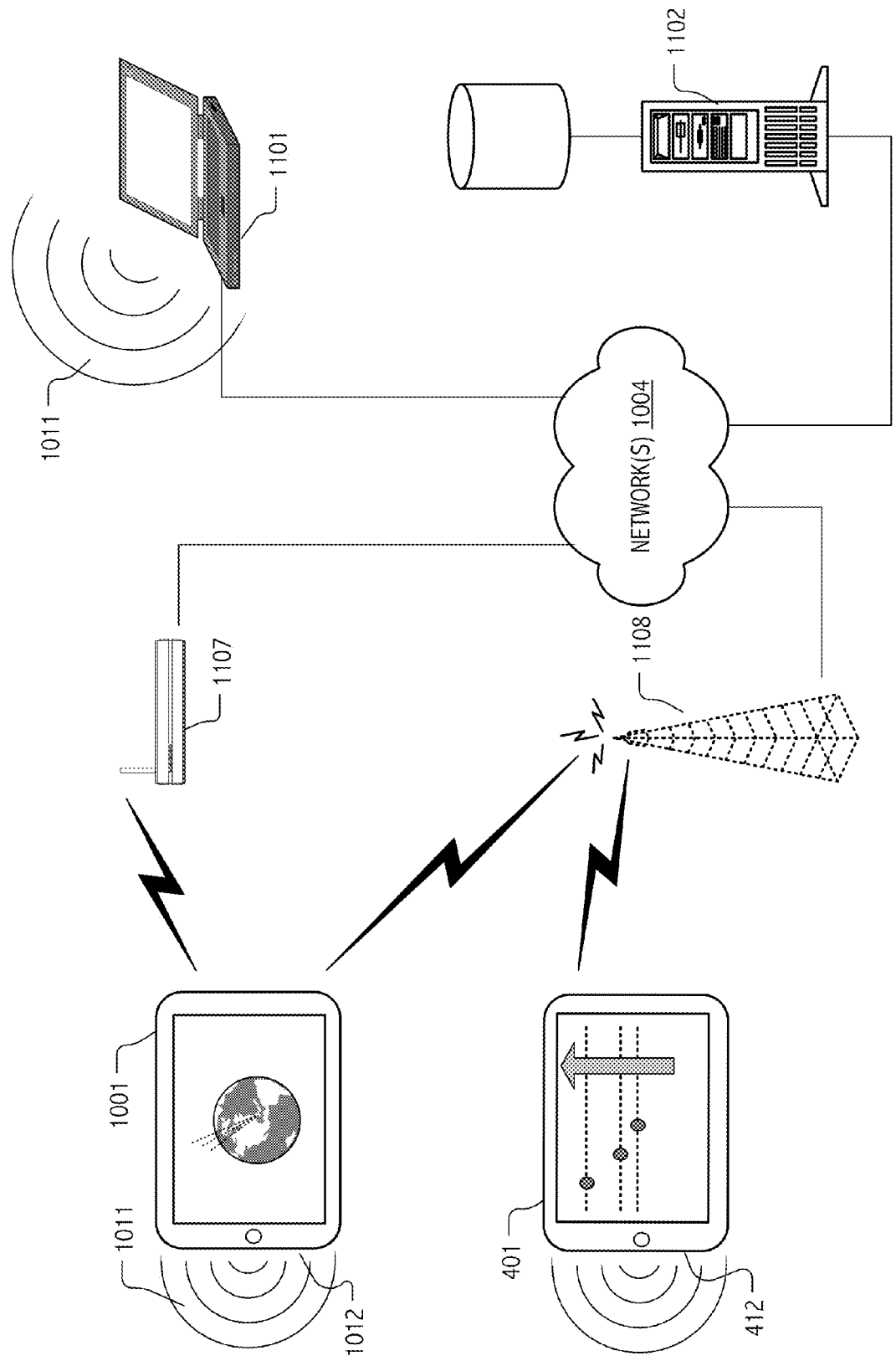
FIG. 11 is a network diagram that illustrates cooperation of exemplary devices in accordance with some embodiments of the present invention.

FIG. 10 is a functional block diagram that illustrates capture, encoding and transmission of a gesture stream (or other) encoding corresponding to a user performance on a synthetic multi-string instrument (e.g., an instance of Magic Guitar application 450 executes on portable computing device 401, recall FIGS. 4 and 9) together with receipt of such encoding (wirelessly communicated (1022) and acoustically rendered (1011)) on a remote device 1001. As in the prior illustrations, an instance of Magic Guitar application (here instance 450A) executes on the portable computing device (here remote device 1001). In some cases, modes or embodiments, note and/or chord soundings gestured (418) by the user musician at touch screen/display 414 of portable computing device 401 are captured and conveyed to remote device 1001, where they may be used to drive a digital synthesis (454) of the synthetic guitar. Note that while conveyance of the captured gesture stream from device 401 to device 1001 may be supported in some cases, modes or embodiments, particularly where performance and capture of an accompaniment (at remote device 1001) is desired, in other cases, modes or embodiments, an encoding an audio rendering of the remotely captured performance may be conveyed and audibly rendered at remote device 1001. FIG. 11 is a network diagram that illustrates cooperation of exemplary devices in accordance with some embodiments of the present invention.

While the invention(s) is (are) illustrated and described with reference to various embodiments, it will be understood that these embodiments are illustrative and that the scope of the invention(s) is not limited to them. Many variations, modifications, additions, and improvements are possible. For example, while a synthetic guitar implementation has been used as an illustrative example, variations on the techniques described herein for other synthetic multi-string musical instruments (e.g., guitars, violins, etc.) will be appreciated. Furthermore, while certain illustrative processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile device or portable computing device) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of providing a synthetic instance of a multi-string musical instrument using a portable computing device, the method comprising:

capturing chord sounding gestures indicated by a user on a multi-touch sensitive display of the portable computing device, wherein the captured chord sounding gestures include, for particular and respective chords so gestured, contact by multiple fingers of the user's hand and wherein the captured chord sounding gestures are characterized by respective geometries of the multiple-finger contacts rather than solely by positional registrations of individual finger contacts relative to string or fret positions;

distinguishing between respective of the multiple-finger contact geometries gestured by the user and based thereon passing a stream of chord indicative inputs to a digital synthesis of the multi-string musical instrument executing on the portable computing device; and in correspondence with the stream of captured chord indicative gestures, audibly rendering a performance on the portable computing device using the digital synthesis.

2. The method of claim 1, wherein the chord sounding gesture capturing includes retrieving, in response to a multi-touch application programmer interface (API) notification, a touch count and coordinates for respective ones of the touches.

3. The method of claim 2, wherein the distinguishing includes, for two-touch contact gestures indicative of a two-note chord:

characterizing orientation of line traceable through the touch coordinates and based thereon distinguishing between at least some supported ones of the two-touch contact gestures.

4. The method of claim 3, wherein the distinguishing further includes characterizing first-dimension coordinates of a captured two-touch contact gesture to distinguish between major and minor chords.

5. The method of claim 2, wherein the distinguishing includes, for three-touch contact gestures indicative of a three-note chord:

characterizing both shape defined by the touch coordinates and an orientation thereof; and based on the shape and orientation characterization, distinguishing between at least some supported ones of the three-touch contact gestures.

6. The method of claim 3, wherein the distinguishing further includes:

for a three-touch contact gesture characterized as an upward-pointed, triangular arrangement, indicating a G major chord;

for a three-touch contact gesture characterized as an downward-pointed, triangular arrangement, indicating a D major chord;

for a three-touch contact gesture characterized as a generally-linear arrangement, sloping upwards left-to-right, indicating a C major chord; and for a three-touch contact gesture characterized as a generally-linear arrangement, sloping downwards left-to-right, indicating an F major chord.

7. The method of claim 3, wherein the distinguishing further includes for four-touch contact gestures indicative of a four-note chord:

characterizing both shape defined by coordinates of an initial three of the four touches and by an orientation thereof;

further characterizing a positional relation between the characterized shape and a fourth of the four touches;

based on the shape and orientation characterization of the initial three (3) touch coordinates, initially distinguishing between at least some supported major chords; and based on the characterized positional relation, distinguishing between major and dominant $7^{th}$ variants of the initially distinguished major chords.

8. The method of claim 2, wherein the distinguishing includes characterizing second-dimension coordinates of a captured multi-touch contact gesture to distinguish between a root chord and one or more successive inversions thereof.

9. The method of claim 1, wherein the chord sounding gesture capturing includes capture of both:

a multi-touch chord selection gesture; and a traveling-touch, strum-type gesture.

10. The method of claim 1, further comprising:

providing a synthetic strum in accord with score-coded meter, the synthetic strum releasing a constituent note or chord indications to the digital synthesis based on a then-current one of the captured note sounding gestures.

11. The method of claim 1, wherein the distinguishing is contextually constrained based at least in part on a then-current musical key.

12. The method of claim 11, wherein the current musical key is either user-selected or score-coded.

13. The method of claim 1, further comprising:

responsive to the captured chord sounding gestures, visually displaying strings of the multi-string musical instrument on the multi-touch sensitive display in correspondence with the user's performance and at positions beneath one or more of the respective finger contacts.

14. The method of claim 13, wherein selection and positioning of the visually displayed strings are dynamically varied in correspondence with the captured chord sounding gestures.

15. The method of claim 13, wherein fret positions and lateral extent of the visually displayed strings are dynamically varied in correspondence with the captured chord sounding gestures.

16. The method of claim 1, further comprising:

presenting the user of the synthetic musical instrument with visual cues on the multi-touch sensitive display, the presented visual cues indicative of temporally sequenced chord selections to be sounded by the user in accord with a musical score.

17. The method of claim 16, wherein the chord-indicative visual cues are presented using a symbology evocative of shape and orientation of finger contacts that define a particular chord sounding gesture cued.

18. The method of claim 16, wherein the presented visual cues include at least some visual cues indicative of individual note selections.

19. The method of claim 16, wherein notwithstanding multi-string nature of the synthetic musical instrument, the presentation of the visual cues is piano roll style, wherein individual visual cues travel toward pitch indicative positions along a laterally extended sounding zone of the multi-touch sensitive display.

20. The method of claim 19, wherein lateral extent of the sounding zone is dynamically allocated so that pitch range of available notes and spacing between note selective positions distributes a current contextually relevant set of sounding positions along the available lateral extent of a multi-touch sensitive display.

21. The method of claim 16, further comprising:

determining correspondence of respective captured chord sounding gestures with the visually cued chord selections; and grading the user's performance at least in part based on the determined correspondences, wherein the determined correspondences include (i) a measure of temporal correspondence of a particular chord sounding gesture with arrival of a visual cue in the sounding zone and (ii) a measure correspondence of the chord sounded with the visual cue.

22. The method of claim 1, wherein the stream of chord indicative inputs includes constituent pluralities of note selection inputs consistent with a temporal sequence of the captured and distinguished chord sounding gestures.

23. The method of claim 1, wherein the digital synthesis includes a sample-based synthesis of constituent notes of the captured chord.

24. The method of claim 1, wherein the digital synthesis includes a sample-based synthesis of the captured chord.

25. The method of claim 1, wherein the audible rendering includes:

modeling acoustic response for the multi-string instrument; and driving the modeled acoustic response with inputs corresponding to the captured chord sounding gestures.

26. The method of claim 16, wherein the synthetic multi-string instrument is a guitar, and wherein the visual cues travel across the multi-touch sensitive display and represent, in one dimension of the multi-touch sensitive display, desired finger contacts along a fretless single-string analog of the multi-string instrument in accordance with notes of the score and, in a second dimension generally orthogonal to the first, temporal sequencing of the desired finger contacts paced in accord with a current tempo.

27. The method of claim 1, further comprising:

presenting on the multi-touch sensitive display a lesson plan of exercises, wherein the captured chord selection gestures correspond to performance by the user of a particular one of the exercises; and advancing the user to a next exercise of the lesson plan based on a grading of the user's performance of the particular exercise.

28. The method of claim 1,
wherein the portable computing device includes a communications interface,
the method further comprising, transmitting an encoded stream of the note selection gestures via the communications interface for rendering of the performance on a remote device.

29. The method of claim 28, further comprising:
geocoding the transmitted gesture stream; and
displaying a geographic origin for, and in correspondence with audible rendering of, another user's performance encoded as another stream of notes sounding gestures received via the communications interface directly or indirectly from a remote device.

30. The method of claim 1, wherein the portable computing device is selected from the group of:
a compute pad;
a game controller;
a personal digital assistant or book reader; and
a mobile phone or media player.

31. A computer program product encoded in one or more non-transitory media, the computer program product including instructions executable on a processor of the portable computing device to cause the portable computing device to perform the method of claim 1.

32. The computer program product of claim 31, wherein the one or more non-transitory media are readable by the portable computing device or are readable in a course of conveying the computer program product to the portable computing device.

33. An apparatus comprising:
a portable computing device having a multi-touch sensitive display; and
machine readable code executable on the portable computing device to implement a synthetic musical instrument, the machine readable code including instructions executable to capture chord sounding gestures indicated by a user on the multi-touch sensitive display, wherein the capture of chord sounding gestures includes, for particular and respective chords so gestured, registration of contact by multiple fingers of the user's hand and distinguishing between respective geometries of the multiple-finger contacts, wherein the captured chord sounding gestures are characterized by the respective multiple-finger contact geometries rather than solely by positional registrations of individual finger contacts relative to string or fret positions,
the machine readable code still further executable to audibly render the user's performance on the portable computing device using, as an input to a digital synthesis of the synthetic musical instrument executing on the portable computing device, a gesture stream that includes the captured chord sounding gestures, wherein the gesture stream, and not the musical score itself, drives the digital synthesis.

34. The apparatus of claim 33,
embodied as one or more of a compute pad, a game controller, a handheld mobile device, a mobile phone, a personal digital assistant, a media player and a book reader.

35. A computer program product encoded in non-transitory media and including instructions executable to implement a synthetic multi-string musical instrument on a portable computing device having a multi-touch display interface, the computer program product encoding and comprising:
instructions executable by the portable computing device to capture chord sounding gestures indicated by a user on the multi-touch sensitive display, wherein the captured chord sounding gestures include, for particular and respective chords so gestured, contact by multiple fingers of the user's hand and wherein the captured chord sounding gestures are characterized by respective geometries of the multiple-finger contacts rather than solely by positional registrations of individual finger contacts relative to string or fret positions;
instructions executable by the portable computing device to distinguish between respective of the multiple-finger contact geometries gestured by the user and based thereon to pass a stream of chord indicative inputs to a digital synthesis of the multi-string musical instrument executing on the portable computing device; and
instructions executable by the portable computing device as the digital synthesis to audibly render a performance in correspondence with the stream of captured chord indicative gestures.

36. The computer program product of claim 35,
wherein the instructions executable by the portable computing device to distinguish between respective of the multiple-finger contact geometries, include instruction sequences to distinguish two-, three- and four-touch gestures.

37. The computer program product of claim 35,
wherein the instructions executable by the portable computing device to capture chord sounding gestures capture both multi-touch chord selection gestures and a traveling-touch, strum-type gesture.

38. The computer program product of claim 35, further comprising:
instructions executable to determine correspondence of respective captured chord sounding gestures with the chord selections visually cued in the sounding zone and to grade the user's performance based on the determined correspondences.

39. The computer program product of claim 35, wherein the non-transitory media are readable by the portable computing device or are readable in a course of conveying the computer program product to the portable computing device.

40. A method comprising:
using a portable computing device as a multi-string synthetic musical instrument;
presenting a user of the synthetic musical instrument with visual cues on a multi-touch sensitive display of the portable computing device, the presented visual cues indicative of temporally sequenced note selections to be sounded by the user in accord with a musical score, wherein notwithstanding multi-string nature of the synthetic musical instrument, the presentation of the visual cues is piano roll style, wherein individual visual cues travel toward pitch indicative positions along a laterally extended sounding zone of the multi-touch sensitive display, and wherein at least one of the presented visual cues indicates a string bend performance effect to be sounded by the user in accord with the musical score;
capturing note sounding gestures indicated by the user using the multi-touch sensitive display; and
audibly rendering the performance on the portable computing device using the captured gesture stream as an input to a digital synthesis of the synthetic musical instrument executing on the portable computing device, wherein the captured gesture stream, and not the musical score itself, drives the digital synthesis.

41. The method of claim 40,
wherein the captured note sounding gestures include finger contacts at pitch selective positions along the laterally extended sounding zone.

42. The method of claim 40,
wherein the captured note sounding gestures for the string bend performance effect include finger contact and in-contact travel on the multi-touch sensitive display in a direction generally orthogonal to lateral extent of the sounding zone.

43. The method of claim 40,
wherein the audible rendering in correspondence with a captured string bend indicative gesture varies pitch from an initial pitch to a pitch corresponding to a note selection coded in the musical score.

44. The method of claim 40,
wherein the audible rendering in correspondence with a captured string bend indicative gesture varies pitch from a pitch corresponding to a note selection coded in the musical score.

45. The method of claim 40,
wherein lateral extent of the note sounding zone is dynamically allocated so that pitch range of available notes and spacing between note selective positions distributes a current contextually relevant set of note sounding positions along the available lateral extent of a multi-touch sensitive display.

46. The method of claim 40,
wherein the captured note sounding gestures include, for a particular chord visually cued in accordance with the musical score, contact by multiple fingers of the user's hand.

47. The method of claim 46, further comprising:
distinguishing between plural multi-finger contact geometries as chord indicative gestures; and
in correspondence with a captured chord indicative gesture, audibly rendering a corresponding multi-string chord using the digital synthesis.

48. The method of claim 40,
wherein at least one of the presented visual cues indicates a vibrato performance effect in accord with the musical score; and
further comprising capturing and including a vibrato indicative gesture in the gesture stream supplied as input to the digital synthesis of the synthetic string instrument executing on the portable computing device.

49. The method of claim 48, further comprising:
capturing the vibrato indicative gesture using an on-board accelerometer of the portable computing device.

50. The method of claim 40, further comprising:
determining correspondence of respective captured note sounding gestures with the note selections visually cued in the sounding zone; and
grading the user's performance based on the determined correspondences.

51. The method of claim 50, wherein the determined correspondences include:
a measure of temporal correspondence of a particular note sounding gesture with arrival of a visual cue in the sounding zone; and
a measure of note selection correspondence of the particular note sounding gesture with the visual cue.

52. The method of claim 50, wherein the determined correspondences include:
a measure of temporal correspondence of the string bend performance effect with arrival of the corresponding visual cue in the sounding zone.

53. The method of claim 40,
wherein the synthetic multi-string instrument is a guitar, and
wherein the visual cues travel across the multi-touch sensitive display and represent, in one dimension of the multi-touch sensitive display, desired finger contacts along a fretless single-string analog of the multi-string instrument in accordance with notes of the score and, in a second dimension generally orthogonal to the first, temporal sequencing of the desired finger contacts paced in accord with a current tempo.

54. The method of claim 53,
wherein the sounding zone corresponds generally to a generally linear display feature on the multi-touch sensitive display toward or across which the visual cues travel.

55. The method of claim 40,
wherein the captured note sounding gestures are indicative of both string excitation and pitch selection for the excited string.

56. The method of claim 40, further comprising:
presenting on the multi-touch sensitive display a lesson plan of exercises, wherein the captured note selection gestures correspond to performance by the user of a particular one of the exercises; and
advancing the user to a next exercise of the lesson plan based on a grading of the user's performance of the particular exercise.

57. The method of claim 40,
wherein the portable computing device includes a communications interface,
the method further comprising, transmitting an encoded stream of the note selection gestures via the communications interface for rendering of the performance on a remote device.

58. The method of claim 57, further comprising:
geocoding the transmitted gesture stream; and
displaying a geographic origin for, and in correspondence with audible rendering of, another user's performance encoded as another stream of notes sounding gestures received via the communications interface directly or indirectly from a remote device.

59. The method of claim 40, wherein the audible rendering includes:
modeling acoustic response for the multi-string instrument; and
driving the modeled acoustic response with inputs corresponding to the captured note sounding gestures.

60. The method of claim 40, wherein the portable computing device is selected from the group of:
a compute pad;
a game controller;
a personal digital assistant or book reader; and
a mobile phone or media player.

61. A computer program product encoded in one or more non-transitory media, the computer program product including instructions executable on a processor of the portable computing device to cause the portable computing device to perform the method of claim 40.

62. The computer program product of claim 61, wherein the one or more non-transitory media are readable by the portable computing device or are readable in a course of conveying the computer program product to the portable computing device.

63. An apparatus comprising:
- a portable computing device having a multi-touch display interface; and
- machine readable code executable on the portable computing device to implement a synthetic musical instrument, the machine readable code including instructions executable to present a user of the synthetic musical instrument with visual cues on the multi-touch sensitive display, the presented visual cues indicative of temporally sequenced note selections to be sounded by the user in accord with a musical score, wherein notwithstanding multi-string nature of the synthetic musical instrument, the presentation of the visual cues is piano roll style, wherein individual ones of the visual cues travel toward pitch indicative positions along a laterally extended sounding zone of the multi-touch sensitive display, and wherein at least one of the presented visual cues indicates a string bend performance effect to be sounded by the user in accord with the musical score;
- the machine readable code further executable to capture note sounding gestures indicated by the user using the multi-touch sensitive display and to audibly render the performance on the portable computing device using the captured gesture stream as an input to a digital synthesis of the synthetic musical instrument executing on the portable computing device, wherein the captured gesture stream, and not the musical score itself, drives the digital synthesis.

64. The apparatus of claim 63,
- the machine readable code further executable to, in correspondence with a captured string bend indicative gesture, vary an audibly rendered pitch to or from a pitch corresponding to a note selection coded in the musical score.

65. The apparatus of claim 63,
- the machine readable code further executable to distinguishing between plural multi-finger contact geometries as chord indicative gestures and, in correspondence with a captured chord indicative gesture, audibly render a corresponding multi-string chord using the digital synthesis.

66. The apparatus of claim 63,
- embodied as one or more of a compute pad, a game controller, a handheld mobile device, a mobile phone, a personal digital assistant, a media player and a book reader.

67. A computer program product encoded in non-transitory media and including instructions executable to implement a synthetic multi-string musical instrument on a portable computing device having a multi-touch display interface, the computer program product encoding and comprising:
- instructions executable by the portable computing device to present a user of the synthetic musical instrument with visual cues on the multi-touch sensitive display, the presented visual cues indicative of temporally sequenced note selections to be sounded by the user in accord with a musical score, wherein notwithstanding multi-string nature of the synthetic musical instrument, the presentation of the visual cues is piano roll style, wherein individual ones of the visual cues travel toward pitch indicative positions along a laterally extended sounding zone of the multi-touch sensitive display, and wherein at least one of the presented visual cues indicates a string bend performance effect to be sounded by the user in accord with the musical score;
- instructions executable by the portable computing device to capture note sounding gestures indicated by the user using the multi-touch sensitive display; and
- instructions executable by the portable computing device to audibly render the performance on the portable computing device using the captured gesture stream as an input to a digital synthesis of the synthetic musical instrument executing on the portable computing device, wherein the captured gesture stream, and not the musical score itself, drives the digital synthesis.

68. The computer program product of claim 63, further comprising:
- instructions executable to determine correspondence of respective captured note sounding gestures with the note selections visually cued in the sounding zone and to grade the user's performance based on the determined correspondences.

69. The computer program product of claim 63, wherein the non-transitory media are readable by the portable computing device or are readable in a course of conveying the computer program product to the portable computing device.

* * * * *